United States Patent
Chihara et al.

(10) Patent No.: US 8,055,239 B2
(45) Date of Patent: Nov. 8, 2011

(54) COMMUNICATION CONTROL DEVICE, LOCATION-DEPENDENT CHARGE CONTROL SYSTEM, AND LOCATION-DEPENDENT CHARGE CONTROL METHOD

(75) Inventors: Shinpei Chihara, Minato-ku (JP); Kenichi Ishii, Minato-ku (JP)

(73) Assignee: NEC Corporation, Tokyo (JP)

( * ) Notice: Subject to any disclaimer, the term of this patent is extended or adjusted under 35 U.S.C. 154(b) by 610 days.

(21) Appl. No.: 12/296,652

(22) PCT Filed: Mar. 20, 2007

(86) PCT No.: PCT/JP2007/055605
§ 371 (c)(1),
(2), (4) Date: Oct. 9, 2008

(87) PCT Pub. No.: WO2007/119440
PCT Pub. Date: Oct. 25, 2007

(65) Prior Publication Data
US 2009/0203351 A1    Aug. 13, 2009

(30) Foreign Application Priority Data
Apr. 10, 2006    (JP) ................................. 2006-107493

(51) Int. Cl.
*H04M 11/00*    (2006.01)
(52) U.S. Cl. ..... 455/406; 455/408; 455/445; 455/456.1; 455/41.2
(58) Field of Classification Search .......... 455/405–408, 455/445, 456.1–457, 41.2
See application file for complete search history.

(56) References Cited

U.S. PATENT DOCUMENTS

| | | | | |
|---|---|---|---|---|
| 5,303,297 A | * | 4/1994 | Hillis ............................. | 455/406 |
| 6,044,261 A | * | 3/2000 | Kazmi .......................... | 455/408 |
| 6,169,890 B1 | * | 1/2001 | Vatanen ........................ | 455/406 |
| 6,205,326 B1 | * | 3/2001 | Tell et al. ...................... | 455/406 |
| 6,542,728 B1 | * | 4/2003 | Kaku ............................. | 455/406 |
| 6,552,661 B1 | * | 4/2003 | Lastinger et al. .......... | 340/572.1 |
| 6,671,506 B1 | * | 12/2003 | Lee ............................... | 455/406 |

(Continued)

FOREIGN PATENT DOCUMENTS

JP    10-094000 A    4/1998

(Continued)

*Primary Examiner* — Sharad Rampuria
(74) *Attorney, Agent, or Firm* — Sughrue Mion, PLLC

(57) ABSTRACT

A communication control device (500) is capable of communicating with both a portable telephone terminal (100) and a location management device (400) that specifies the location of the portable telephone terminal (100). The communication control device (500) includes: a charge area management storage unit (530) that holds data regarding fee payment areas in which businesses that differ from the user of portable telephone terminal (100) pay the communication fees of the portable telephone terminal, a line connection unit (520) that can connect the portable telephone terminal (100) and the terminal of a communication partner while making the communication control device side the payer of communication fees of the portable telephone terminal (100), and a line connection management unit (510) that, upon accepting a communication request from the portable telephone terminal (100), acquires the location of the portable telephone terminal (100) from the location management device (400) and provides connection instructions to the line connection unit (520) to connect the portable telephone terminal (100) with the terminal of the communication partner while making the communication control device side the payer of the communication fees of the portable telephone terminal (100) only when the location of the portable telephone terminal (100) is contained in a fee payment area indicated by data held in the charge area management storage unit (530).

55 Claims, 27 Drawing Sheets

U.S. PATENT DOCUMENTS

| | | | |
|---|---|---|---|
| 6,785,544 B2 * | 8/2004 | Kim et al. | 455/433 |
| 6,829,467 B2 * | 12/2004 | Ochiai | 455/41.2 |
| 6,862,444 B2 * | 3/2005 | Karaoguz et al. | 455/408 |
| 6,934,689 B1 * | 8/2005 | Ritter et al. | 705/17 |
| 6,950,646 B2 * | 9/2005 | Pradhan et al. | 455/406 |
| 6,993,319 B2 * | 1/2006 | Himmel et al. | 455/406 |
| 7,072,639 B2 * | 7/2006 | Marsh et al. | 455/406 |
| 7,079,850 B2 * | 7/2006 | Cameron | 455/456.1 |
| 7,113,764 B1 * | 9/2006 | Jang et al. | 455/404.1 |
| 7,599,680 B2 * | 10/2009 | Patenaude et al. | 455/406 |
| 7,613,445 B1 * | 11/2009 | Stanev | 455/407 |
| 2003/0233278 A1 * | 12/2003 | Marshall | 705/14 |

FOREIGN PATENT DOCUMENTS

| | | |
|---|---|---|
| JP | 2000-287000 A | 10/2000 |
| JP | 2001-238264 A | 8/2001 |
| JP | 2003-152903 A | 5/2003 |
| JP | 2003-174663 A | 6/2003 |
| JP | 2003-319098 A | 11/2003 |

* cited by examiner

Fig. 3

| area information |
|---|
| business facilities A south area |
| business facilities A east area |
| business facilities B north area |
| : |

| area information |
|---|
| 0<X<100, 10<Y<20, 5≦Z<10 |
| 100<X<150, 0<Y<10, 0≦Z<10 |
| 150<X<200, 10<Y<20, 5≦Z<10 |
|  |

Fig. 5

```
                5321
                 ┌─────────────┐
                 │    area     │
                 │ information │
                 ├─────────────┤
                 │ zone ID: 5  │
                 ├─────────────┤
                 │ zone ID: 8  │
                 ├─────────────┤
                 │ zone ID: 10 │
                 ├─────────────┤
                 │      :      │
                 └─────────────┘
```

Fig. 6

| 5331<br>area<br>information | 5332<br>payer business | 5333<br>object |
|---|---|---|
| business facilities A east area | service business A | call origin: ○<br>call destination: × |
| business facilities A east area | service business A | call origin: ○<br>call destination: × |
| business facilities B north area | service business B | call origin: ○<br>call destination: × |
| : | : | : |

Fig. 7

| area information (5341) | payer business (5342) | object (5343) | line connection method (5344) |
|---|---|---|---|
| business facilities A south area | service business A | call origin: ○<br>call destination: × | connection method: called-party charge number service<br>number: 0120-111122 |
| business facilities A east area | service business A | call origin: ○<br>call destination: × | connection method: called-party charge number service<br>numbers: 0120-111123;<br>0120-123456 |
| business facilities B north area | service business B | call origin: ○<br>call destination: ○ | connection method: call-back service<br>number: 03-1234-5678 |
| .. | .. | .. | .. |

Fig. 8

| area information | payer business | object | valid time |
|---|---|---|---|
| business facilities A south area | service business A | call origin: ○<br>call destination: × | 60 seconds |
| business facilities A east area | service business A | call origin: ○<br>call destination: × | 120 seconds |
| business facilities B north area | service business B | call origin: ○<br>call destination: × | 30 seconds |
| : | : | : | : |

| area information 5361 | payer business 5362 | object 5363 | line connection method 5364 | valid time 5365 |
|---|---|---|---|---|
| business facilities A south area | service business A | call origin: ○<br>call destination: × | connection method: called-party charge number service<br>number: 0120-111122 | 60 seconds |
| business facilities A east area | service business A | call origin: ○<br>call destination: × | connection method: called-party charge number service<br>number: 0120-111123 | 120 seconds |
| business facilities B north area | service business B | call origin: ○<br>call destination: × | connection method: called-party charge number service<br>number: 0120-222233 | 30 seconds |
| .. | .. | .. | .. | .. |

Fig. 15

| location ID | logical information | coordinate information | zone ID information |
|---|---|---|---|
| 01010011 | business facilities A south area | X=50, Y=15, Z=5 | zoneID=5 |
| 01010012 | first floor south entrance area | X=10, Y=100, Z=5 | zoneID=3 |
| 01010013 | first floor east side corridor | X=15, Y=10, Z=10 | zoneID=1 |
| ... | ... | ... | ... |

4301  4302  4303  4304

COMMUNICATION CONTROL DEVICE, LOCATION-DEPENDENT CHARGE CONTROL SYSTEM, AND LOCATION-DEPENDENT CHARGE CONTROL METHOD

TECHNICAL FIELD

The present invention relates to a charging system and device directed toward portable telephones, and in particular, relates to a communication control device, a location-dependent charge control system, and a location-dependent charge control method that, when a portable telephone terminal is used for communication, can control the party that is charged communication fees according to the location of the portable telephone terminal.

BACKGROUND ART

Location-dependent charging services have been investigated that apply a charge scheme of different communication fees according to the location of a portable telephone terminal at the time of communication. These services allow all or a portion of communication fees relating to communication in a specific area to be excused or enable the alteration of the charged party to an entity other than the owner of the portable telephone. Such features have enabled the promotion of portable telephone use and the activation of specific areas.

Examples of location-dependent chare control systems of the related art for realizing these services are disclosed in Patent Document 1 (JP-A-2000-287000), Patent Document 2 (JP-A-2003-174663), and Patent Document 3 (JP-A-2003-152903).

In the system described in Patent Document 1, charge rates with communication fees that differ for each area are prepared in advance, communication fees are calculated according to the location of a portable telephone terminal at the time of communication that is found by a position management device and the communication time that the portable telephone terminal was used, and the user of the portable telephone terminal is billed with these communication fees.

The system described in Patent Document 2 permits communication at fees that are cheaper than normal communication fees when a location management device recognizes that the user of a portable telephone terminal is in the vicinity of a preregistered area at the time of use of the portable telephone terminal.

The object of the system described in Patent Document 3 is to attract customers of a service business that runs a business in a specific area.

In the system described in Patent Document 3, a communication business that manages a portable telephone network determines, for each area, payment ratios (fee payment ratios) for the user of the portable telephone and the service business for paying communication fees of a portable telephone in each area based on requests of service businesses.

The communication business can then, when adjusting communication fees, proportionally bill the service businesses for all or a portion of the communication fees that would normally be billed to the user of the portable telephone according to the payment ratios that have been determined for each of these areas and a communication record that is classified by area.

Patent Document 1: JP-A-2000-287000
Patent Document 2: JP-A-2003-174663
Patent Document 3: JP-A-2003-152903

DISCLOSURE OF THE INVENTION

Problem to be Solved by the Invention

The location-dependent charge control systems described in Patent Document 1 and Patent Document 2 can vary the communication fees according to location.

However, the entity that is billed for communication fees cannot be changed to a third party that differs from both the portable telephone user and communication business according to location.

The communication business that manages a portable telephone network is therefore unable to bill a third party for the portion of communication fees that was reduced in areas in which the communication fees are set lower than normal, and this results in a decrease of the communication charge income obtained from each individual portable telephone user by the communication business.

In contrast, the location-dependent charge control system described in Patent Document 3 allows the entity that is billed for all or a portion of the communication fees to be changed according to location to a third party such as a service business that runs a business in a specific area, this third party differing from both the portable telephone user and the communication business.

If the service business thus pays all or a portion of the communication fees of the portable telephone user, the portable telephone user is able to carry out communication at no charge or at a lower than normal charge in this area. As a result, more people can be attracted to this area as clients, and the power to attract customers in this area can be improved.

However, in the system described in Patent Document 3, the payment process is normally carried out using the portable telephone communication records obtained from the telephone exchange of a portable telephone network that only the communication business can manage.

As a result, the businesses that can provide a location-dependent charging service to each service business and portable telephone user are limited to communication businesses that manage portable telephone networks.

In such a case, a service business that wishes to utilize a location-dependent charge service for improving customer appeal must contract a location-dependent charge service with each communication business.

In actuality, however, it can be assumed that whether a location-dependent charge service is provided by a communication business and, when a location-dependent charge service is provided, the service content (size and shape of areas and the charging scheme of each area) will differ for each communication business.

In addition, considering a service in a business facility such as a department store, it can be assumed that, depending on the users of portable telephones, there will also be a variety of communication businesses that have contracts with portable telephone users that visit the service area.

In other words, it is highly likely that services will vary in the same area according to each communication business, and a situation can therefore easily occur in which a uniform location-dependent charging service cannot be offered to all portable telephone users within the same area.

Thus, in the location-dependent charge control system described in Patent Document 3, the problem occurs that location-dependent charge services can only be offered in forms that depend on each communication business.

Accordingly, it is an object of the present invention to provide a communication control device, a location-dependent charge control system, and a location-dependent charge control method that allow the object of charging of communication fees that accompany use of a portable telephone terminal to be controlled according to the location of the portable telephone terminal at the time of communication and not according to the communication business.

Means for Solving the Problem

To achieve the above-described object, the communication control device according to the present invention is a communication control device capable of communicating with both a portable telephone terminal that transmits a communication request that designates the terminal of a communication partner and a location management device for specifying the location of the portable telephone terminal, the communication control device changing the payer of communication fees of the portable telephone terminal according to the location that is specified by the location management device, and the communication control device further including: a charge area management storage unit for holding data regarding fee payment areas in which businesses that differ from the user of the portable telephone terminal pay the communication fees of the portable telephone terminal; a communication control unit that can connect the portable telephone terminal with the terminal of the communication partner while making the communication control device side the payer of the communication fees of the portable telephone terminal; and a communication management unit that, upon receiving the communication request from the portable telephone terminal, acquires the location of the portable telephone terminal from the location management device, and provides the communication control unit with connection instructions to connect the portable telephone terminal with the terminal of the communication partner while making the communication control device side the payer of the communication fees of the portable telephone terminal only when the location of the portable telephone terminal is contained within a fee payment area indicated by data held in the charge area management storage unit.

In addition, the location-dependent charge control method according to the present invention is a location-dependent charge control method performed by a communication control device that can communicate with both a portable telephone terminal that transmits a communication request that designates the terminal of a communication partner and a location management device for specifying the location of the portable telephone terminal, and further, that includes a charge area management storage unit for holding data regarding fee payment areas in which businesses that differ from the user of the portable telephone terminal pay communication fees of the portable telephone terminal; the location-dependent charge control method including: a location acquisition step of, when the communication request is accepted from the portable telephone terminal, acquiring the location of the portable telephone terminal from the location management device; and a connection management step of connecting the portable telephone terminal with the terminal of the communication partner while making the communication control device side the payer of communication fees of the portable telephone terminal only when the location of the portable telephone terminal is contained in a fee payment area shown by data that are held in the charge area management storage unit.

According to the above-described invention, the payer of the communication fees of a portable telephone terminal is the communication control device side and the portable telephone terminal is connected to the terminal of the communication partner only when the location of the portable telephone terminal is contained in a fee payment area. As a result, the object of charging of communication fees that accompany use of the portable telephone terminal can be controlled according to the location of the portable telephone terminal during communication without depending on a communication business.

In addition, the communication control unit preferably connects the portable telephone terminal with the terminal of the communication partner by way of a fixed telephone network, and the communication management unit preferably provides the communication control unit with instructions to connect the portable telephone terminal to the terminal of the communication partner such that the communication fees of the portable telephone terminal are billed to the communication control device side from the charge system of the fixed telephone network only when the location of the portable telephone terminal is contained in the fee payment area indicated by data that are held in the charge area management storage unit.

In addition, the communication management unit preferably provides instructions to the portable telephone terminal to connect directly to the terminal of the communication partner without being relayed through the communication control unit when the location of the portable telephone terminal is not contained in the fee payment area indicated by data that are held in the charge area management storage unit.

In addition, when the location of the portable telephone terminal is contained in the fee payment area indicated by data that are held in the charge area management storage unit, the communication management unit preferably both supplies instructions to the portable telephone terminal to transmit to the communication control unit by a prescribed telephone number whereby the receiving side is charged, and provides instructions to the communication control unit to accept the transmission from the portable telephone terminal by the prescribed telephone number and then connect the portable telephone terminal to the terminal of the communication partner.

According to the above-described invention, the use of a prescribed telephone number whereby the receiving side is charged enables the object of charging of communication fees that accompany the use of a portable telephone terminal to be controlled according to the location of the portable telephone terminal at the time of communication without depending on a communication business.

In addition, when the location of the portable telephone terminal is contained in the fee payment area indicated by data that are held in the charge area management storage unit, the communication management unit preferably provides instructions to the communication control unit to transmit to both the portable telephone terminal and the terminal of the communication partner and then connect the portable telephone terminal to the terminal of the communication partner.

According to the above-described invention, the use of the so-called "call-back" enables the object of charging communication fees that accompany the use of a portable telephone terminal to be controlled according to the location of the portable telephone terminal at the time of communication without depending on the communication business.

In addition, the communication control device can preferably communicate with a charge-object management device for recording a communication record between the portable telephone terminal and the terminal of the communication partner; the charge area management storage unit preferably holds, in correspondence with data for the fee payment areas, business information for specifying businesses that pay communication fees of the portable telephone terminal in the fee payment areas; and the communication management unit preferably monitors the communication record between the portable telephone terminal and the terminal of the communication partner by way of the communication control unit and records the communication record and the business information that corresponds to the location of the portable telephone terminal that has been acquired from the location management device in the charge-object management device.

According to the above-described invention, the administrator of the communication control device is able to distribute and bill the communication fees that are to be billed to the communication control device side to each business based on the communication record and business information that are recorded in the charge-object management device.

In addition, the charge area management storage unit preferably holds, in correspondence with data for the fee payment areas, valid time information indicating the valid time of communication for which communication fees of the user of the portable telephone terminal are excused in the fee payment areas; and the communication control unit preferably limits communication between the portable telephone terminal and the terminal of the communication partner based on the valid time that corresponds to the location of the portable telephone terminal that has been acquired from the location management device.

Further, the location management device preferably specifies the location of the terminal of the communication partner; and the communication management unit preferably acquires the location of the terminal of the communication partner from the location management device when the communication request from the portable telephone terminal has been accepted and provides instructions to the communication control unit to connect the portable telephone terminal with the terminal of the communication partner while making the communication control device side the payer of the communication fees of the portable telephone terminal when the location of the terminal of the communication partner is contained in the fee payment area indicated by data that are held in the charge area management storage unit.

In addition, the charge area management storage unit preferably holds, in correspondence with data for the fee payment areas, business information for specifying businesses that pay communication fees of the portable telephone terminal in the fee payment areas and telephone numbers used when the communication control unit relays communication of the portable telephone terminal and the terminal of the communication partner; and the communication management unit preferably changes the telephone number used when the communication control unit relays communication between the portable telephone terminal and the terminal of the communication partner according to the location of the portable telephone terminal or according to the business information that corresponds to this location.

In addition, the location management device preferably includes a location ID transmitter for transmitting a location ID by a radio signal and a Location specification unit for accepting from the portable telephone terminal the location ID that is received by the portable telephone terminal and for specifying the location of the portable telephone terminal based on the location ID.

In addition, the communication control device according to the present invention is a communication control device that can communicate with each of a portable telephone terminal that transmits a communication request that designates the terminal of a communication partner, a location management device for specifying the location of the portable telephone terminal, and a charge-object management device for managing a communication record in the location of use of the portable telephone terminal, the communication control device including:

a charge area management storage unit for holding, in correspondence with the location of the portable telephone terminal, payer information relating to the payer of communication fees of the portable telephone terminal at the location;

a communication control unit for connecting the portable telephone terminal with the terminal of the communication partner that was designated in the communication request by way of a fixed telephone network while making the payer of the communication fees of the portable telephone terminal the communication control device side; and a communication management unit for monitoring the communication record of the portable telephone terminal and the terminal of the communication partner by way of the communication control unit, and further, for acquiring the location of the portable telephone terminal from the location management device, acquiring from the charge area management storage unit the payer information that corresponds to the location of the portable telephone terminal, and recording in the charge-object management device the communication record and the payer information.

Further, the location-dependent charge control method according to the present invention is a location-dependent charge control method performed by a communication control device that can communicate with each of a portable telephone terminal that transmits a communication request that designates the terminal of a communication partner, a location management device for specifying the location of the portable telephone terminal, and a charge-object management device for managing a communication record in locations of use of the portable telephone terminal, and further, that includes a charge area management storage unit for holding, in correspondence with the location of the portable telephone terminal, payer information relating to the payer of communication fees of the portable telephone terminal at the location; the location-dependent charge control method including: a communication control step of connecting the portable telephone terminal with the terminal of the communication partner designated in the communication request by way of a fixed telephone network while making the communication control device side the payer of the communication fees of the portable telephone terminal; a monitoring step of monitoring the communication record of the portable telephone terminal and the terminal of the communication partner; a location acquisition step of acquiring the location of the portable telephone terminal from the location management device; a payer information acquisition step of acquiring from the charge area management storage unit the payer information that corresponds to the location of the portable telephone terminal; and a recording step of recording the communication record and the payer information in the charge-object management device.

According to the above-described invention, the portable telephone terminal is connected with the terminal of the communication partner designated in the communication request while making the payer of the communication fees of the portable telephone terminal the communication control device side, and the communication record of the portable telephone terminal and the terminal of the communication partner by way of the communication control unit and the payer information corresponding to the location at which the portable telephone terminal carries out communication are recorded in the charge-object management device.

As a result, the payer of the communication fees of the portable telephone terminal can be specified based on the information recorded in the charge-object management device. The object of charging of the communication fees that accompany use of a portable telephone terminal can thus be controlled according to the location of the portable telephone terminal during communication without depending on the communication business.

In addition, the administrator of the communication control device can bill the user of the portable telephone terminal for the communication fees that the user of the portable telephone terminal is to pay based on the information recorded in the charge-object management device.

In addition, when a communication request has been accepted from the portable telephone terminal, the communication management unit preferably both provides the portable telephone terminal with instructions to transmit to the communication control unit by a prescribed telephone number by which the call-receiving side is charged and provides the communication control unit with instructions to accept the transmission from the portable telephone terminal by the prescribed telephone number and then connect the portable telephone terminal with the terminal of the communication partner.

According to the above-described invention, the use of the prescribed telephone number by which the call-receiving side is charged allows the object of charging of communication fees that accompany use of the portable telephone terminal to be controlled according to the location of the portable telephone terminal during communication without depending on the communication business.

In addition, the communication management unit preferably, upon having accepted the communication request from the portable telephone terminal, provides instructions to the communication control unit to transmit to both the portable telephone terminal and the communication partner and then to connect the portable telephone terminal with the terminal of the communication partner.

According to the above-described invention, the use of the so-called call-back allows the object of charging of communication fees that accompany use of the portable telephone terminal to be controlled according to the location of the portable telephone terminal during communication without depending on the communication business.

In addition, the charge area management storage unit preferably holds, as the payer information, business information for specifying businesses that pay communication fees of the portable telephone terminal.

According to the above-described invention, by using the communication records and the business information that are recorded in the charge-object management device, the administrator of the communication control device is able to distribute and bill each business for communication fees that accompany use of the portable telephone terminal at locations that are registered in the charge area management storage unit and bill the user of the portable telephone terminal for communication fees at other locations.

In addition, the charge area management storage unit preferably holds, in correspondence with the location of the portable telephone terminal or with the business information, valid time information that indicates valid time of communication in which communication fees of the user of the portable telephone terminal are excused.

Still further, the communication control unit preferably limits communication between the portable telephone terminal and the terminal of the communication partner based on the valid time.

In addition, the communication management unit preferably records in the charge-object management device communication that uses the communication control unit following the valid time as communication that is billed to the user of the portable telephone terminal.

According to the above-described invention, the administrator of the communication control device is able to bill the user of a portable telephone terminal for communication fees that follow valid time based on the information that is recorded in the charge-object management device.

In addition, the charge area management storage unit preferably holds, in correspondence with the location of the portable telephone terminal or the business information, payment ratios of the user of the portable telephone terminal and businesses for communication fees; and the communication management unit preferably records in the charge-object management device the payment ratios that correspond to the location of the portable telephone terminal together with the communication record.

According to the above-described invention, the administrator of the communication control device is able to distribute and bill to each of the businesses and the user of the portable telephone terminal the communication fees that are billed to the communication control device side based on the communication record and payment ratios that are recorded in the charge-object management device.

In addition, the location management device preferably specifies the location of the terminal of the communication partner, and the communication management unit, upon having accepted the communication request from the portable telephone terminal, preferably acquires the location of the terminal of the communication partner from the location management device, acquires from the charge area management storage unit the payer information that corresponds to the location of the terminal of the communication partner, and records the payer information in the charge-object management device.

The charge area management storage unit preferably registers, in addition to the business information, telephone numbers that are used when the communication control unit relays communication between the portable telephone terminal and the terminal of the communication partner; and the communication management unit preferably changes the telephone number used when the communication control unit relays communication between the portable telephone terminal and the terminal of the communication partner according to the location of the portable telephone terminal or the business information.

In addition, the location management device preferably includes a location ID transmitter for transmitting a location ID by a radio signal, and a location specification unit for accepting from the portable telephone terminal the location ID received by the portable telephone terminal and specifying the location of the portable telephone terminal based on the location ID.

Alternatively, the communication control device according to the present invention is a communication control device that can communicate with each of a portable telephone terminal that transmits a communication request that designates the terminal of a communication partner, a location management device for specifying the location of the portable telephone terminal, and a charge-object management device for managing a communication record in the location of use of the portable telephone terminal, the communication control device including: a charge area management storage unit for holding, in correspondence with the location of the portable telephone terminal, payer information relating to the payer of communication fees of the portable telephone terminal at the location; a communication control unit for connecting the portable telephone terminal with the terminal of the communication partner that was designated in the communication request by way of a fixed telephone network while making the payer of the communication fees of the portable telephone terminal the portable telephone terminal side; and a communication management unit for monitoring the communication record of the portable telephone terminal and the terminal of the communication partner by way of the communication control unit, and further, for acquiring the location of the portable telephone terminal from the location management device, acquiring from the charge area management storage unit the payer information that corresponds to the location of the portable telephone terminal, and recording in the charge-object management device the communication record and the payer information.

Further, the location-dependent charge control method according to the present invention is a location-dependent charge control method performed by a communication control device that can communicate with each of a portable telephone terminal that transmits a communication request that designates the terminal of a communication partner, a location management device for specifying the location of the portable telephone terminal, and a charge-object management device for managing a communication record in the locations of use of the portable telephone terminal, and further, that includes a charge area management storage unit for holding, in correspondence with the location of the portable telephone terminal, payer information relating to the payer of communication fees of the portable telephone terminal at the location; the location-dependent charge control method including: a communication control step of connecting the portable telephone terminal with the terminal of the communication partner designated in the communication request by way of a fixed telephone network while making the payer of communication fees of the portable telephone terminal the portable telephone terminal side; a monitoring step of monitoring the communication record of the portable telephone terminal and the terminal of the communication partner; a location acquisition step of acquiring the location of the portable telephone terminal from the location management device; a payer information acquisition step of acquiring from the charge area management storage unit the payer information that corresponds to the location of the portable telephone terminal; and a recording step of recording the communication record and the payer information in the charge-object management device.

According to the above-described invention, the portable telephone terminal is connected with the terminal of the communication partner designated in the communication request while making the payer of the communication fees of the portable telephone terminal the portable telephone terminal side, and the communication record of the portable telephone terminal and terminal of the communication partner by way of the communication control unit and the payer information corresponding to the location at which the portable telephone terminal carries out communication are recorded in the charge-object management device.

As a result, the payer of the communication fees of the portable telephone terminal can be specified based on the information recorded in the charge-object management device, whereby the object of charging of the communication fees that accompany use of the portable telephone terminal can be controlled according to the location of the portable telephone terminal during communication without depending on the communication business.

The administrator of the communication control device is therefore able to refund communication fees based on the information recorded in the charge-object management device when communication fees of the user of the portable telephone terminal are excused.

In addition, the communication management unit, upon having accepted the communication request from the portable telephone terminal, preferably both provides the portable telephone terminal with instructions to transmit to the communication control unit by a specified telephone number by which the transmitting side is billed and provides the communication control unit with instructions to receive the transmission from the portable telephone terminal by the specified telephone number and then connect the portable telephone terminal with the terminal of the communication partner.

According to the above-described invention, the communication control device is able to connect the portable telephone terminal and the terminal of the communication partner by using a specified telephone number.

In addition, the charge area management storage unit preferably holds business information for specifying businesses that pay communication fees of the portable telephone terminal.

According to the above-described invention, by using the communication record and business information that are recorded in the charge-object management device, the administrator of the communication control device is able to both refund to the user of the portable telephone terminal communication fees that accompany use of the portable telephone terminal in a location registered in the charge area management storage unit and distribute and bill each business for the refunded communication fees.

The administrator of the communication control device is further able to, for example, determine refund information indicating the amount that should be refunded to the user of the portable telephone terminal based on the information recorded in the charge-object management device, distribute and report this refund information to each business, and have each business refund communication fees to the user of the portable telephone terminal based on the refund information.

In addition, the charge area management storage unit preferably holds, in correspondence with the location of the portable telephone terminal or the business information, valid time information indicating valid time of communication for which the communication fees of the user of the portable telephone terminal are excused.

In addition, the communication control unit preferably limits communication of the portable telephone terminal and the terminal of the communication partner based on the valid time.

The communication management unit further preferably records in the charge-object management device communication that uses the communication control unit following the valid time as communication for which the user of the portable telephone terminal is billed.

According to the above-described invention, the administrator of the communication control device is able to refund only those communication fees that are within the valid time to the user of the portable telephone terminal based on the information recorded in the charge-object management device.

In addition, the charge area management storage unit preferably holds, in correspondence with the location of the portable telephone terminal or the business information, payment ratios of the user of the portable telephone terminal and the businesses for the communication fees; and the communication management unit preferably records in the charge-object management device the payment ratios that correspond to the location of the portable telephone terminal together with the communication record.

According to the above-described invention, the administrator of the communication control device or each business is able to refund communication fees to the user of the portable telephone terminal based on the communication record and payment ratios that are recorded in the charge-object management device.

Further, the location management device preferably specifies the location of the terminal of the communication partner; and the communication management unit preferably, upon having accepted the communication request from the portable telephone terminal, acquires the location of the terminal of the communication partner from the location management device, acquires from the charge area management storage unit the payer information that corresponds to the location of the terminal of the communication partner, and records the payer information in the charge-object management device.

In addition, the charge area management storage unit preferably registers, in addition to the business information, telephone numbers that are used when the communication control unit relays communication of the portable telephone terminal and the terminal of the communication partner; and the communication management unit preferably changes the telephone number used when the communication control unit relays communication of the portable telephone terminal and the terminal of the communication partner according to the location of the portable telephone terminal or the business information.

In addition, the location management device preferably includes a location ID transmitter for transmitting a location ID by a radio signal, and a location specification unit for accepting from the portable-telephone terminal the location ID received by the portable telephone terminal and specifying the location of the portable telephone terminal based on the location ID.

Alternatively, the communication control device according to the present invention is a communication control device that can communicate with each of a portable telephone terminal that reports communication starts and communication ends, a location management device for specifying the location of the portable telephone terminal, and a charge-object management device for managing a communication record in the location of use of the portable telephone terminal, the communication control device including: a charge area management storage unit for holding, in correspondence with the location of the portable telephone terminal, payer information relating to the payer of communication fees of the portable telephone terminal at the location; and a communication management unit for monitoring the communication record of the portable telephone terminal and the terminal of the communication partner of the portable telephone terminal based on the communication starts and communication ends reported from the portable telephone terminal, and further, for acquiring the location of the portable telephone terminal from the location management device, acquiring from the charge area management storage unit the payer information that corresponds to the location of the portable telephone terminal, and recording in the charge-object management device the communication record and the payer information.

Further, the location-dependent charge control method according to the present invention is a location-dependent charge control method performed by a communication control device that can communicate with each of a portable telephone terminal for transmitting a communication request that designates the terminal of a communication partner, a location management device for specifying the location of the portable telephone terminal, and a charge-object management device for managing the communication record in the location of use of the portable telephone terminal, and further, that includes a charge area management storage unit for holding, in correspondence with the location of the portable telephone terminal, payer information relating to the payer of communication fees of the portable telephone terminal at the location; the location-dependent charge control method including: a communication control step of connecting the portable telephone terminal with the terminal of the communication partner designated in the communication request while making the payer of the communication fees of the portable telephone terminal the portable telephone terminal side; a monitoring step of monitoring the communication record of the portable telephone terminal and the terminal of the communication partner; a location acquisition step of acquiring the location of the portable telephone terminal from the location management device; a payer information acquisition step of acquiring from the charge area management storage unit payer information that corresponds to the location of the portable telephone terminal; and a recording step of recording the communication record and the payer information in the charge-object management device.

According to the above-described invention, a portable telephone terminal is connected with the terminal of the communication partner that was designated in the communication request, and the communication record of the portable telephone terminal and the terminal of the communication partner that is monitored based on the communication starts and communication ends that are reported from the portable telephone terminal and the payer information corresponding to the location at which the portable telephone terminal carries out communication are recorded in the charge-object management device.

As a result, the payer of the communication fees of the portable telephone terminal can be specified based on the information recorded in the charge-object management device, whereby the object of charging of communication fees that accompany use of the portable telephone terminal can be controlled according to the location of the portable telephone terminal during communication without depending on the communication business.

In addition, when the communication fees of the user of the portable telephone terminal are excused, the administrator of the communication control device is further able to refund the communication fees based on the information recorded in the charge-object management device.

The charge area management storage unit preferably holds, as the payer information, business information for specifying businesses that pay communication fees of the portable telephone terminal.

According to the above-described invention, based on the communication record and the business information that are recorded in the charge-object management device, the administrator of the communication control device is able to both refund to the user of the portable telephone terminal those communication fees that accompany use of the portable telephone terminal at a location that is registered in the charge area management storage unit and distribute and bill each of the businesses for the communication fees that were refunded.

In addition, the administrator of the communication control device is able to determine refund information that indicates the amount that should be refunded to the user of the portable telephone terminal based on the information that is recorded in the charge-object management device, distribute and report this refund information to each business, and have each business refund the communication fees to the user of the portable telephone terminal based on the refund information.

In addition, the charge area management storage unit preferably holds, in correspondence with the location of the portable telephone terminal or the business information, valid time information indicating valid times of communication for which communication fees of the user of the portable telephone terminal are excused.

The communication management unit preferably records, in the charge-object management device, communication that follows the valid time as communication for which the user of the portable telephone terminal is billed.

According to the above-described invention, the administrator of the communication control device is able to refund to the user of the portable telephone terminal only those communication fees within the valid time based on the information recorded in the charge-object management device.

In addition, the charge area management storage unit preferably holds, in correspondence with the location of the portable telephone terminal or the business information, payment ratios of the user of the portable telephone terminal and the businesses for the communication fees; and the communication management unit preferably records in the charge-object management device the payment ratios that correspond to the location of the portable telephone terminal together with the communication record.

According to the above-described invention, the administrator of the communication control device or each business is able to refund communication fees to the user of the portable telephone terminal based on the communication record and the payment ratios that are recorded in the charge-object management device.

In addition, the location management device preferably further specifies the location of the terminal of the communication partner; and the communication management unit preferably further acquires the location of the terminal of the communication partner from the location management device, acquires from the charge area management storage unit the payer information that corresponds to the location of the terminal of the communication partner, and records the payer information in the charge-object management device.

In addition, the location management device preferably further includes a location ID transmitter for transmitting a location ID by a radio signal, and a location specification unit for accepting from the portable telephone terminal the location ID that was received by the portable telephone terminal and specifying the location of the portable telephone terminal based on the location ID.

In addition, the location-dependent charge control system according to the present invention includes the above-described communication control device, and a location management device for specifying the location of a portable telephone terminal that communicates with the communication control device.

The location-dependent charge control system according to the present invention includes the above-described communication control device, a location management device for specifying the location of a portable telephone terminal that communicates with the communication control device, and a charge-object management device for managing the communication record in the location of use of the portable telephone terminal.

According to the above-described invention, the object of charging of communication fees that accompany use of a portable telephone terminal can be controlled according to the location of the portable telephone terminal during communication without depending on the communication business.

EFFECT OF THE INVENTION

According to the present invention, the object of charging of communication fees that accompany use of a portable telephone terminal can be changed according to the location of the portable telephone terminal during communication without relying on the communication business.

BRIEF DESCRIPTION OF THE DRAWINGS

FIG. 3 shows an example of the configuration of the charge area management storage unit according to the present invention;

FIG. 4 shows an example of the configuration of the charge area management storage unit according to the present invention;

FIG. 5 shows an example of the configuration of the charge area management storage unit according to the present invention;

FIG. 6 shows an example of the configuration of the charge area management storage unit according to the present invention;

FIG. 7 shows an example of the configuration of the charge area management storage unit according to the present invention;

FIG. 8 shows an example of the configuration of the charge area management storage unit according to the present invention;

FIG. 9 shows an example of the configuration of the charge area management storage unit according to the present invention;

FIG. 15 shows an example of the configuration of the transmitter installation information storage unit in modification 1 of the first exemplary embodiment;

Figure 1:
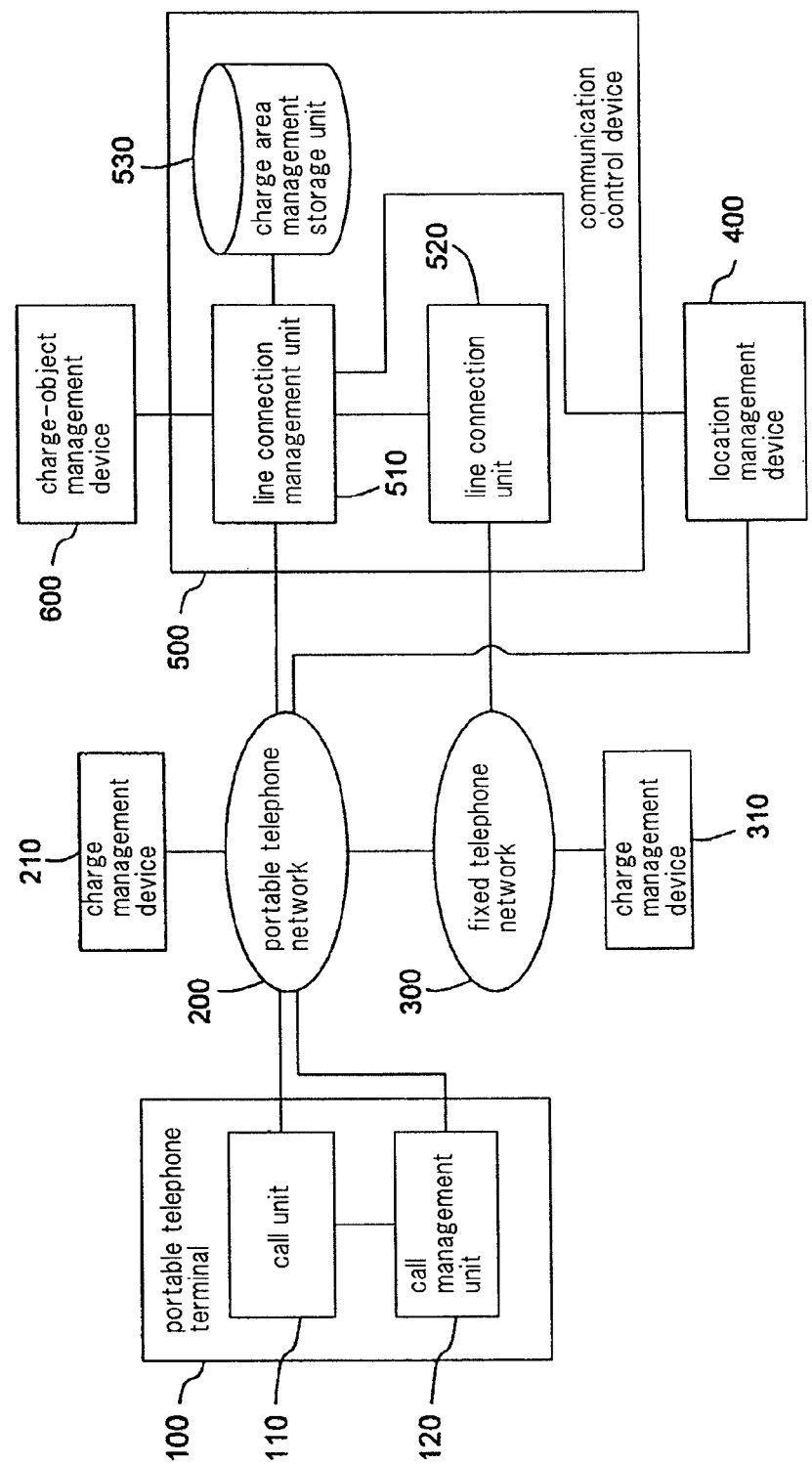
FIG. 1 shows an example of the configuration of the system according to the present invention.

EXPLANATION OF REFERENCE NUMBERS 100 portable telephone terminal
110 call unit
120 call management unit
210, 310 charge management device
400 location management device
500 communication control device
510 line connection management unit
520 line connection unit
530 charge area management storage unit
600 charge-object management device

BEST MODE FOR CARRYING OUT THE INVENTION

Explanation next regards details of the best mode of carrying out the present invention with reference to the accompanying figures.

First Exemplary Embodiment

FIG. 1 is a block diagram showing the location-dependent charge control system of the first exemplary embodiment according to the present invention.

In FIG. 1, the location-dependent charge control system of the first exemplary embodiment includes: portable telephone terminal 100, charge management device 210, charge management device 310, location management device 400, communication control device 500, and charge-object management device 600.

Portable telephone terminal 100 includes call unit 110 and call management unit 120. In FIG. 1, only one portable telephone terminal 100 is shown, but a plurality of portable telephone terminals 100 exist.

Charge management device 210 calculates the communication fees when the user of portable telephone terminal 100 uses portable telephone terminal 100 to communicate by way of portable telephone network 200 and bills each object of charging (for example, the users of portable telephone terminals) for the communication fees.

Charge management device 310 calculates the communication fees when the user of a telephone communicates by way of fixed telephone network 300 and bills each object of charging for the communication fees.

Location management device 400 specifies the current location of portable telephone terminal 100. Location management device 400 further specifies the current location of the terminal that is the communication partner of portable telephone terminal 100.

Communication control device 500 includes line connection management unit 510, line connection unit 520, and charge area management storage unit 530, and is connected to fixed telephone network 300.

Line connection management unit 510 instructs to line connection unit 520 the line connection method (the method of connecting portable telephone terminal 100 and the call destination (the terminal that is the communication partner) that is designated by portable telephone terminal 100) according to the location of portable telephone terminal 100.

Line connection unit 520 first accepts the call of portable telephone terminal 100 by a telephone number that is the object of a called-party charge number service in which the communication fees are billed to the receiving side (hereinbelow abbreviated as "called-party charge telephone number") and then uses fixed telephone network 300 to relay this call to the call destination designated by portable telephone terminal 100.

As a result, charge management device 310 bills the administrator of communication control device 500 for the communication fees generated when line connection unit 520 uses fixed telephone network 300 to connect portable telephone terminal 100 to the call destination.

Charge area management storage unit 530 stores the charge destination of communication fees in each area and the line connection method.

Charge-object management device 600 manages the communication record such as the time use when portable telephone terminal 100 carries out communication by way of communication control device 500.

Charge-object management device 600 further records the object of charging that is determined according to the location of portable telephone terminal 100 when there are a plurality of objects of charging besides the user of portable telephone terminal 100.

In addition, charge-object management device 600 distributes to and bills each object of charging for the communication fees that are billed to the administrator of communication control device 500 from charge management device 310 when portable telephone terminal 100 carries out communication by way of communication control device 500.

FIG. 1 shows a case in which there is only one of each of portable telephone network 200 and fixed telephone network 300, but in actuality, portable telephone terminal 100, location management device 400, and communication control device 500 are connected to a plurality of portable telephone networks 200 and fixed telephone networks 300 that are managed by a respective plurality of communication businesses.

Figure 2:
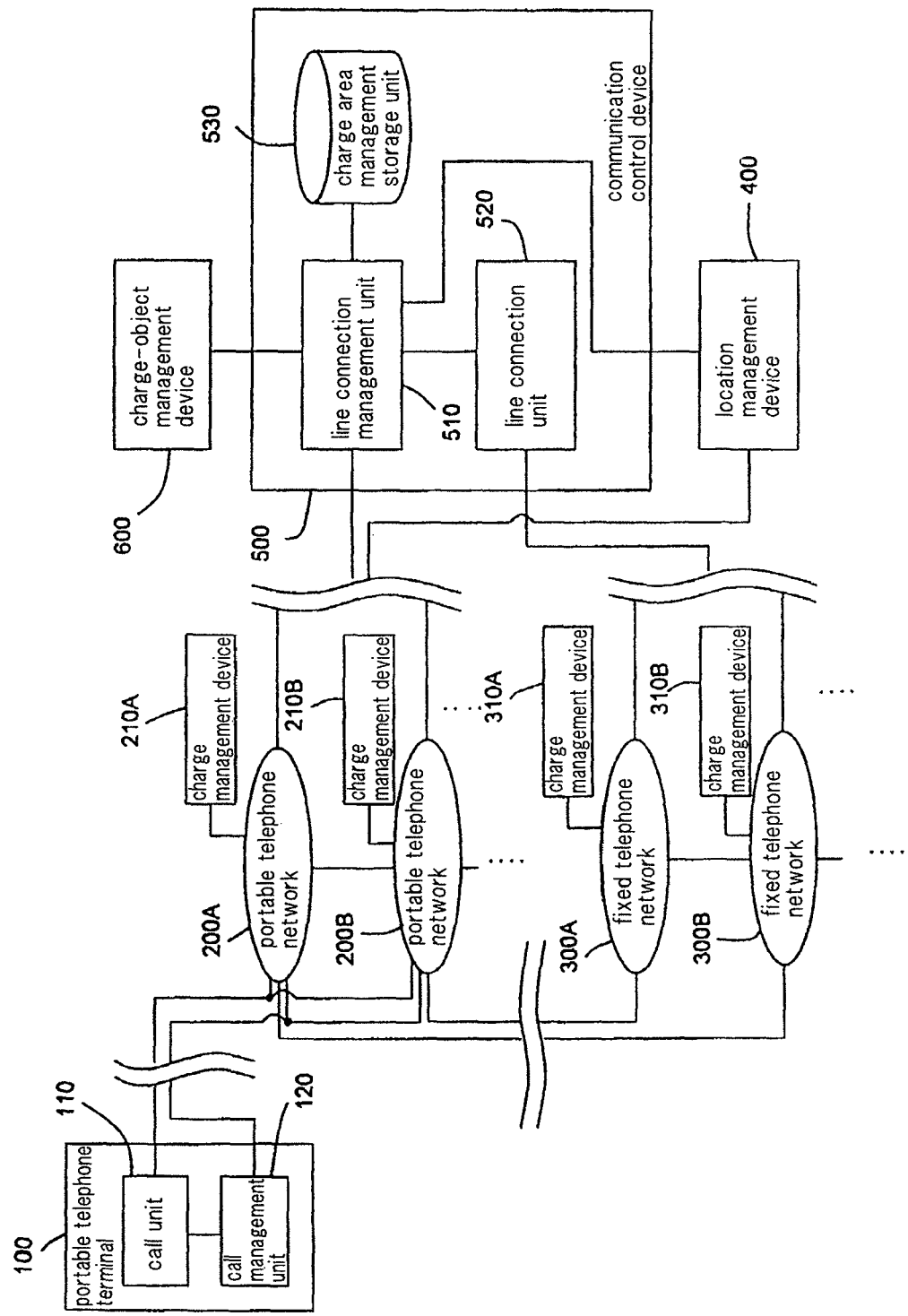
FIG. 2 shows an example of the configuration of the system according to the present invention.

FIG. 2 is a block diagram showing an example in which portable telephone terminal 100, location management device 400, and communication control device 500 are connected to a plurality of portable telephone networks 200A and 200B and charge management devices 210A and 210B of these networks as well as to a plurality of fixed telephone networks 300A and 300B and charge management devices 310A and 310B of these networks. In FIG. 2, components equivalent to those shown in FIG. 1 are given the same reference numbers.

Explanation next regards the details of the configuration of each of the above-described devices and each functional unit with reference to the figures.

Call management unit 120 of portable telephone terminal 100 both reports to communication control device 500 the telephone number of the call destination and submits an inquiry to communication control device 500 regarding the line connection method to determine which line connection method should be used: connecting the call to the call destination by way of communication control device 500 or calling directly to the call destination.

In addition, upon receiving notification of the line connection method that indicates the calling method from communication control device 500, call management unit 120 instructs this line connection method to call unit 110.

Call unit 110 carries out the call in accordance with the line connection method instructed from call management unit 120.

More specifically, when the line connection method indicates connecting with the call destination by way of communication control device 500, call unit 110 calls communication control device 500 by a called-party charge telephone number by which the administrator of communication control device 500 is charged. In addition, this called-party charge telephone number is notified from communication control device 500.

On the other hand, when the line connection method indicates calling the call destination directly, call unit 110 calls the call destination directly without going through communication control device 500.

In the following explanation, a case is described as an example in which the communication business of a portable telephone network manages portable telephone network 200 and charge management device 210, the communication business of a fixed telephone network manages fixed telephone network 300 and charge management device 310, a location-dependent service-providing business other than the communication business manages location management device 400, communication control device 500, and charge-object management device 600, and finally, apart from these businesses, a plurality of service businesses are present that use these location-dependent services.

Information indicating areas that are the object of location-dependent services are registered in charge area management storage unit 530 of communication control device 500. In the areas registered in charge area management storage unit 530, a business that differs from the user of portable telephone terminal 100 pays the communication fees of portable telephone terminal 100.

FIG. 3 is an explanatory view showing an example of information that must be stored in charge area management storage unit 530.

In FIG. 3, each service area 5301 is registered in the logical notation format "business facilities A south area."

The information stored in charge area management storage unit 530 is not limited to the notational format shown in FIG. 3 and is indicated in various notational formats according to the notational format of location information of portable telephone terminal 100 that is acquired from location management device 400.

For example, the information stored in charge area management storage unit 530 may be indicated by a coordinate notational format such as longitude and latitude, or may be indicated in the format of identification numbers such as zone IDs.

FIG. 4 is an explanatory view showing an example in which the information stored in charge area management storage unit 530 is represented in a coordinate notational format such as longitude and latitude, and FIG. 5 is an explanatory view in which the information stored in charge area management storage unit 530 is shown in the format of identification numbers such as zone IDs.

When location management device 400 measures the position of portable telephone terminal 100 by means of a plurality of transmitters or sensors installed along a road, the area may be set by the characteristic ID numbers conferred to each of the transmitters or sensors installed in the object area.

Alternatively, when there is a plurality of service businesses and the service businesses must be distinguished by area, charge area management storage unit 530 may store in advance information relating to fee payment areas and classified by service businesses in addition to the above-described area information, this information indicating which areas, which service businesses, and how much of the communication fees of portable telephone terminal 100 is paid.

In addition, when charge control is being implemented, different charge controls may be carried out according to whether the location information of one of the portable telephone terminal that is the call origin and the portable telephone terminal that is the call destination is to be considered or whether the location information of both portable telephone terminals is to be considered. This control can be realized by adding information such as which portable telephone terminal must be considered to charge area management storage unit 530.

FIG. 6 is an explanatory view showing an example of the information that is stored by charge area management storage unit 530 in these cases.

In FIG. 6, area information 5331, payer business 5332, and object 5333 are stored in association with each other in charge area management storage unit 530.

The column of area information 5331 shows the object areas of the location-dependent charge service. In the example of FIG. 6, as in FIG. 3, the object areas are shown in a logical notational format such as "business facilities A south area."

The column of payer business 5332 shows the service business that, in place of the user of portable telephone terminal 100, pays the communication fees that accompany use of portable telephone terminal 100 in the areas indicated in the column of area information 5331. In addition, information such as the payment ratios of service businesses and maximum payment amounts may be held in the column of payer business 5332.

Information is held in the column of object 5333 regarding, for example, whether the location information of the portable telephone terminal that is the call origin or the portable telephone terminal that is the call destination is to be considered or whether the location of both portable telephone terminals is to be considered when implementing charge control.

Still further, as shown in the example of charge area management storage unit 530 of FIG. 7, a column of line connection method 5344 may be added in addition to the above-described information for storing line connection methods indicating the method for calling from portable telephone terminal 100 to communication control device 500 such as a call-back number service and a called-party charge number service for each payer business and a single telephone number or a plurality of telephone numbers that are used at such times.

In actuality, even when it is determined that a portable telephone terminal is present within an object area at the time communication starts, it can be easily conceived that the portable telephone terminal may move outside the object area during communication.

FIG. 8 is an explanatory view showing an example of charge area management storage unit 530 in which such a possibility is considered.

In the example of FIG. 8, the column of valid time 5354 is newly added.

The time interval over which, when portable telephone terminal 100 goes outside the service area during communication, communication can be continued while charging the service business that is described in the column of payer businesses 5352 is shown as valid time 5354 in the column of valid time 5354.

However, a process may be carried out whereby, when the location of portable telephone terminal 100 cannot be measured during communication, communication for which the service business that is registered in the column of payer business 5352 pays the communication fees can be continued for only the interval of the time interval stored in the column of valid time 5354 from the communication start of portable telephone terminal 100 regardless of whether portable telephone terminal 100 stays in the object area of the time of the communication start or not.

The foregoing are items that can be added to charge area management storage unit 530, only one item being added to the information of charge area management storage unit 530 shown in FIG. 3 in some cases, and a plurality of items being added simultaneously as shown in FIG. 9 in other cases.

Line connection management unit 510 determines the call method of whether portable telephone terminal 100 connects to the call destination by relay through communication control device 500 or portable telephone terminal 100 directly calls the call destination according to whether the location information of portable telephone terminal 100 that is acquired from location management device 400 is registered in charge area management storage unit 530 or not and issues instructions to portable telephone terminal 100 regarding the line connection method that indicates the call method.

More specifically, when the location information of portable telephone terminal 100 that is acquired from location management device 400 is registered in charge area management storage unit 530, line connection management unit 510 provides instructions to portable telephone terminal 100 to connect to the call destination by relay through communication control device 500.

On the other hand, when the location information of portable telephone terminal 100 acquired from location management device 400 is not registered in charge area management storage unit 530, line connection management unit 510 provides instructions to portable telephone terminal 100 to directly call the call destination.

Line connection management unit 510 may also instruct portable telephone terminal 100 such that portable telephone terminal 100 directly calls the call destination by notifying portable telephone terminal 100 that relay through communication control device 500 is not possible.

When the location information of portable telephone terminal 100 acquired from location management device 400 is registered in charge area management storage unit 530, line connection management unit 510 first selects-one telephone number that can be used among the called-party charge telephone numbers held for incoming calls by communication control device 500 (for example, line connection unit 520). Line connection management unit 510 then reports to line connection unit 520 standby instructions to wait for the reception of a call from portable telephone terminal 100 by the selected telephone number and the telephone number of the connection destination (the call destination).

However, when the called-party charge telephone number that is used differs by area or by service business, line connection management unit 510 acquires from charge area management storage unit 530 the called-party charge telephone number that corresponds to each area or to each service business, and reports to line connection unit 520 standby instructions to wait for the call of portable telephone terminal 100 by that telephone number and the telephone number of the connection destination (the call destination).

Line connection unit 520 waits for the call of portable telephone terminal 100 by the telephone number that was reported by line connection management unit 510, and upon accepting the call from portable telephone terminal 100, connects the call to the designated call destination.

In the example of charge area management storage unit 530 of FIG. 3, when the location information of portable telephone terminal 100 that is acquired from location management device 400 is contained in "business facilities A south area," line connection management unit 510 selects one called-party charge telephone number that can be used and reports to portable telephone terminal 100 call instructions to call the telephone number.

Still further, line connection management unit 510 reports to line connection unit 520 standby instructions to relay the call to the call destination of portable telephone terminal 100 upon receiving the call from portable telephone terminal 100.

Line connection unit 520, upon receiving the call from portable telephone terminal 100 after having received the standby instructions, connects the call to the call destination.

Explanation next regards the details of the overall operations in the first exemplary embodiment with reference to the drawings.

Figure 10:
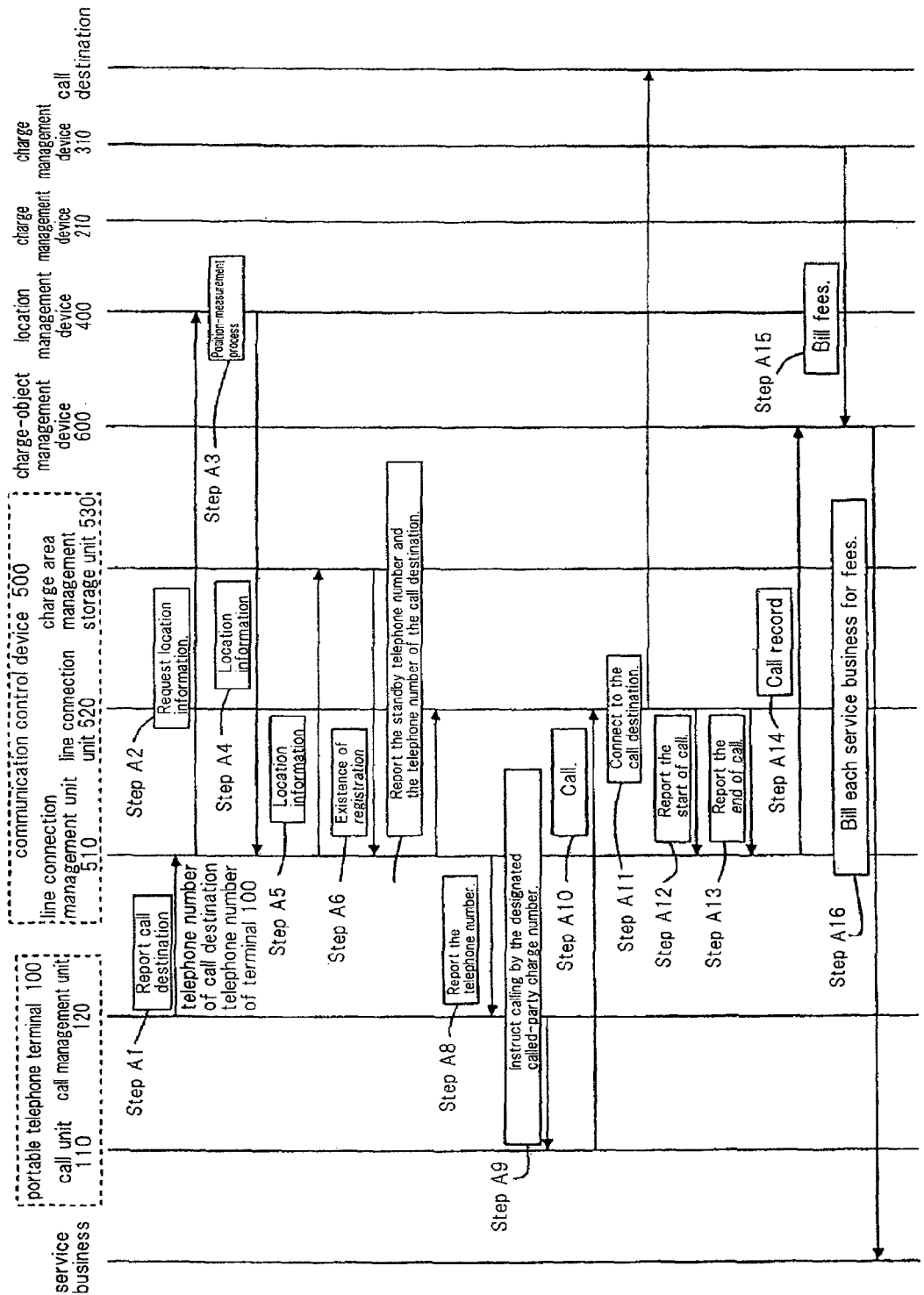
FIG. 10 shows an example of the overall flow of processing in the first exemplary embodiment.
Figure 11:
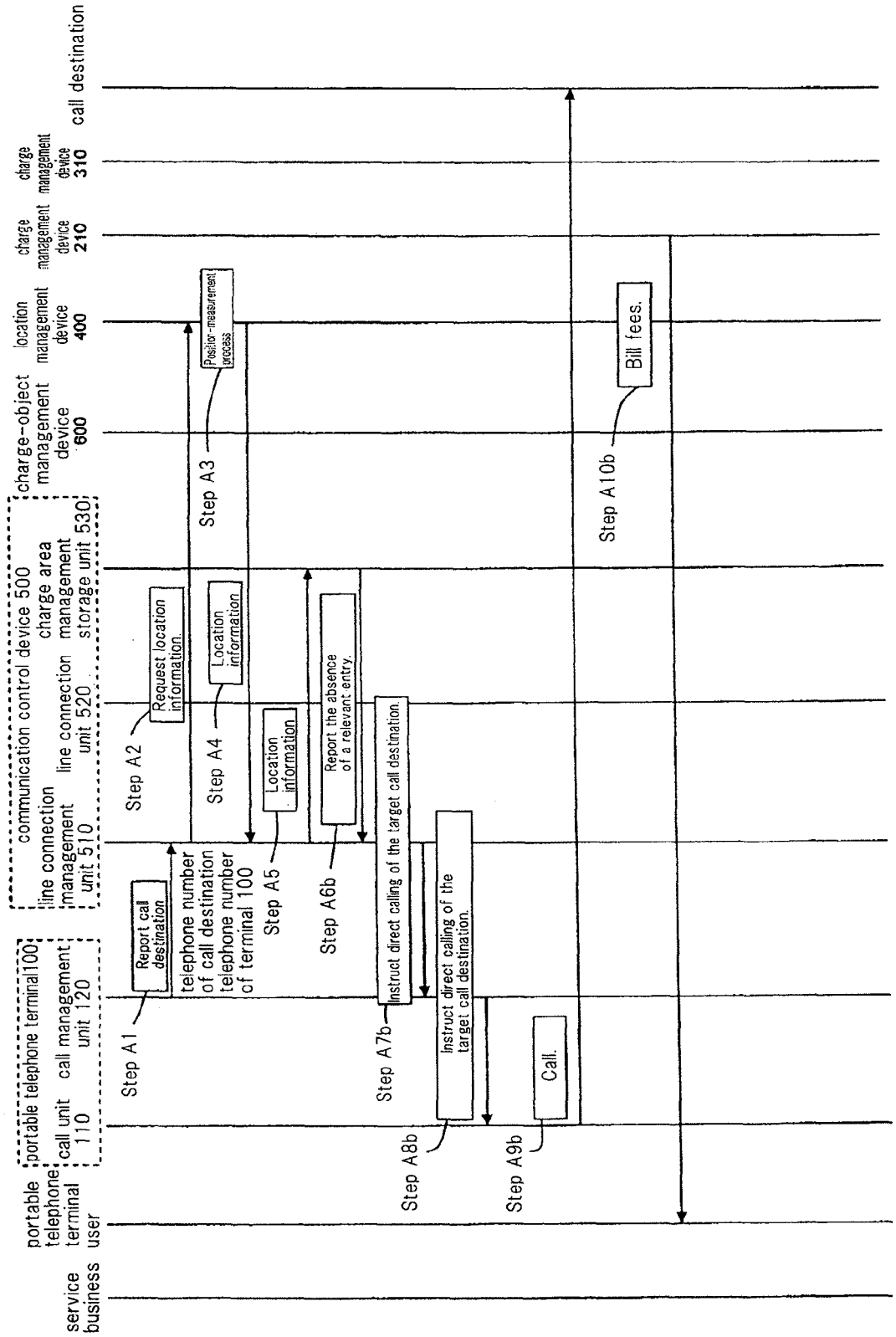
FIG. 11 shows an example of the overall flow of processing in the first exemplary embodiment.
Figure 12:
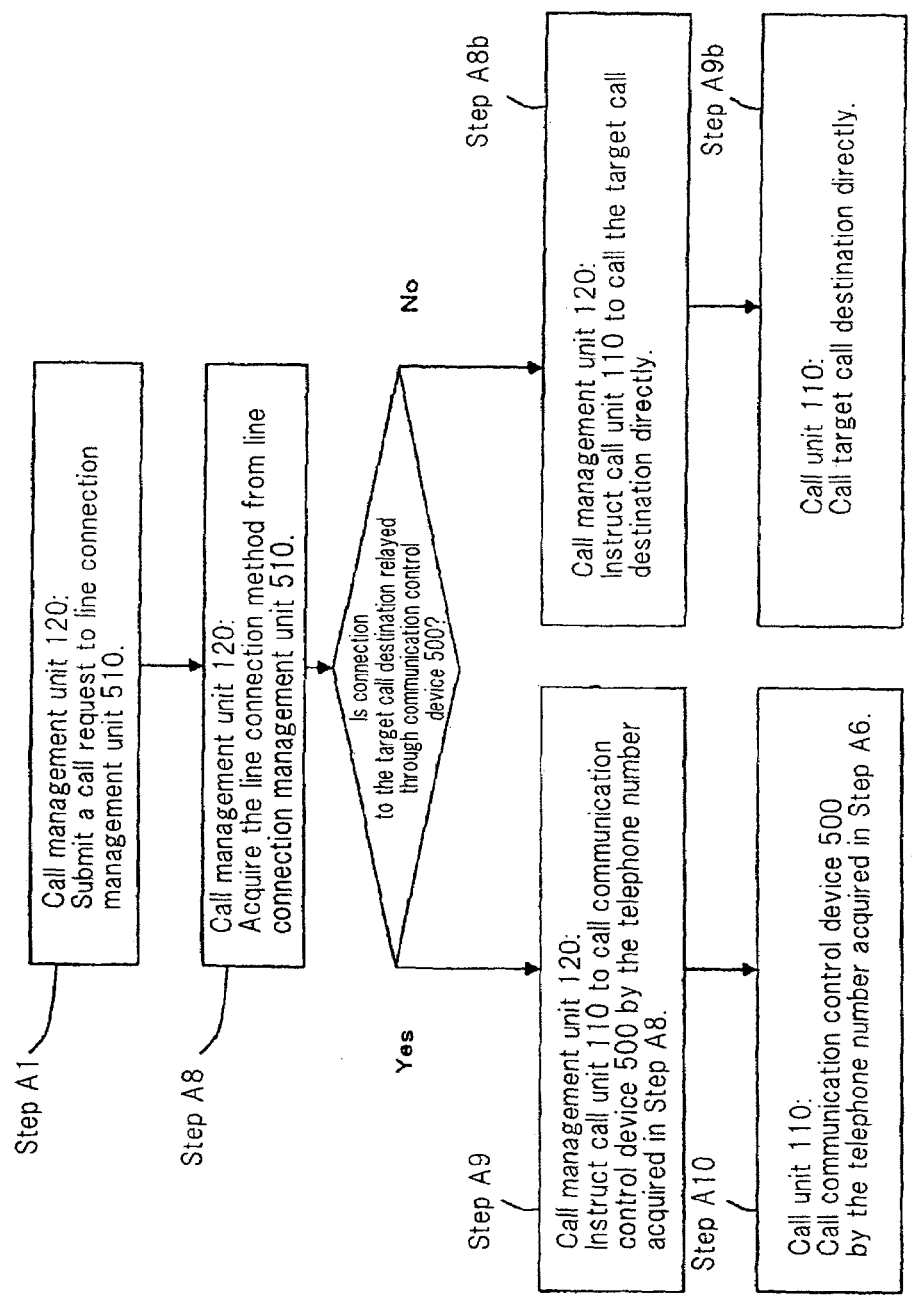
FIG. 12 is a flow chart showing an example of the operations of the portable telephone terminal of the first exemplary embodiment.
Figure 13:
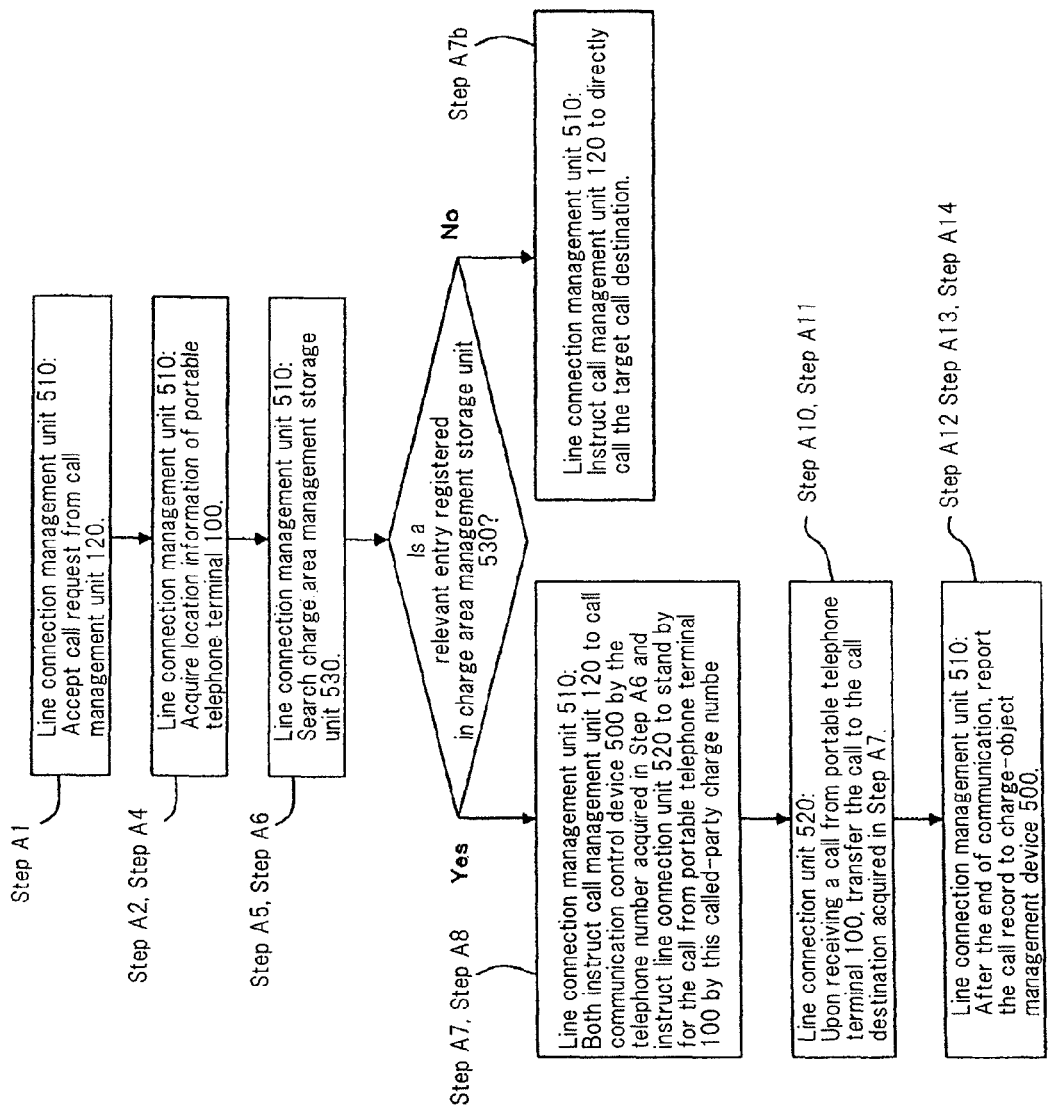
FIG. 13 is a flow chart showing an example of the operations of communication control device of the first exemplary embodiment.

FIG. 10 is a sequence chart for explaining the operations in the first exemplary embodiment when a service business pays the communication fees of the user of portable telephone terminal 100. In addition, FIG. 11 is a sequence chart for explaining the operations when the user of portable telephone terminal 100 pays the communication fees. Still further, FIG. 12 is a flow chart for explaining the flow of processes of portable telephone terminal 100, and FIG. 13 is a flow chart for explaining the flow of processes of communication control device 500.

All explanation here regards a case in which the information shown in FIG. 3 is stored in charge area management storage unit 530.

Explanation is first presented regarding the operations when a service business pays the communication fees of the user of portable telephone terminal 100 with reference to FIG. 10.

First, call management unit 120 of portable telephone terminal 100 issues a call request to line connection management unit 510 of communication control device 500. When making the call request, call management unit 120 reports to line connection management unit 510 the telephone number of the call destination and information characteristic of portable telephone terminal 100 such as a telephone number or a terminal identifier for identifying portable telephone terminal 100 (hereinbelow referred to as "characteristic information") (Step A1).

Upon receiving the call request, line connection management unit 510 requests location management device 400 for location information of portable telephone terminal 100 that is the origin of the call request (Step A2).

Next, location management device 400 uses a position-measurement means (position-measurement device) such as GPS or infrared rays to acquire location information of portable telephone terminal 100 and responds to line connection management unit 510 with the location information of portable telephone terminal 100 (Steps A3 and A4).

The position-measurement process of Step A3 may be carried out before Steps A1 and A2 or cyclically at fixed intervals.

Line connection management unit 510 next searches for area information 5301 that is relevant to the location information of portable telephone terminal 100 from charge area management storage unit 530 (Step A5), and when area information 5301 relevant to the location information of portable telephone terminal 100 is registered in charge area management storage unit 530, acquires this area information 5301.

As shown in FIG. 6, when charge area management storage unit 530 also holds payer business information 5332, line connection management unit 510 also acquires payer business information 5332 that relates to the area.

On the other hand, when area information 5301 relevant to the location information of portable telephone terminal 100 is not registered in charge area management storage unit 530, line connection management unit 510 obtains information indicating that area information is not yet registered (Step A6).

When line connection management unit 510 succeeds in acquiring relevant area information 5301 from charge area management storage unit 530, line connection management unit 510 selects one telephone number that can be used from among the called-party charge telephone numbers that communication control device 500 holds for incoming call use.

Line connection management unit 510 next, upon receiving a call directed to this selected telephone number from portable telephone terminal 100, reports to line connection unit 520 standby instructions to relay this call to the telephone number of the connection destination of the call that was acquired in Step A1 and the characteristic information of portable telephone terminal 100 that was received in Step A1 (Step A7).

Line connection management unit 510 further reports to call management unit 120 of portable telephone terminal 100 call instructions to call communication control device 500 by the selected telephone number (Step A8).

Call management unit 120 next provides call unit 110 with the call instructions that were acquired in Step A8. Call unit 110 connects the call to line connection unit 520 by calling the telephone number that was designated in the call instructions (Steps A9 and A10).

Here, when connecting the call to line connection unit 520, call unit 110 reports to line connection unit 520 the characteristic information of portable telephone terminal 100 (for example, the telephone number of portable telephone terminal 100). A service such as caller number notification that is provided by the communication business may be used in reporting the telephone number that is used as the characteristic information.

When receiving an incoming call, line connection unit 520 checks the characteristic information such as the telephone number or terminal identifier of the call origin terminal, and when this characteristic information matches with the characteristic information reported in Step A7, line connection unit 520 connects the call to the call destination that was reported in Step A7 (Step A11).

Line connection unit 520 further reports the start of the call to line connection management unit 510 simultaneously with the time the call between portable telephone terminal 100 and the call destination starts and reports the end of the call to line connection management unit 510 simultaneously with the end of the call (Steps A12 and A13).

Upon accepting from line connection unit 520 the report of the end of the call, line connection management unit 510 registers the call time in charge-object management device 600 as the use record.

When payer business information 5332 is also acquired in Step A6, line connection management unit 510 also registers payer business information 5332 as the use record in charge-object management device 600 (Step A14).

In the above-described example, line connection management unit 510 registers in charge-object management device 600 the information that the fee-paying business is business A and the call time (communication record).

Finally, charge management device 310 of fixed telephone network 300, rather than billing the user of portable telephone terminal 100, bills the administrator of communication control device 500 that is the object of charging of the called-party charge service for the communication fees of the communication relayed by communication control device 500 that is connected to fixed telephone network 300.

Here, the administrator of communication control device 500 determines the service business that pays the communication fees and the proportion of payment based on the use record acquired in Step A14 and bills each service business for the communication fees that have been determined (Steps A15 and A16).

The foregoing explanation regards the operations when a service business pays the communication fees of the user of portable telephone terminal 100.

Referring to the FIG. 11, explanation next regards the details of operations when the user of portable telephone terminal 100 pays the communication fees.

The processes from Step A1 to Step A4 for a case in which the user of portable telephone terminal 100 pays the communication fees are the same processes as in the operations when a service business pays the communication fees of the user of portable telephone terminal 100.

When the location information acquired in Step A4 is not contained in any of the entries area information 5301 registered in charge area management storage unit 530, line connection management unit 510 obtains information indicating non-registration in Step A6*b*.

Upon receiving notification of non-registration, line connection management unit 510 instructs call unit 110 by way of call management unit 120 to directly call the call destination (Step A7*b* and Step A8*b*).

Upon receiving these instructions, call unit 110 directly calls the call destination (Step A9*b*). In this case, since the call does not go through communication control device 500, the communication fees are all calculated by charge management device 210 of portable telephone network 200 and billed to the user of portable telephone terminal 100 (Step A10*b*).

Modification 1

Explanation next regards the details of an embodiment in which position-measurement that employs a location ID transmitter is applied in location management device 400 as modification 1 of the first exemplary embodiment with reference to the drawings.

Figure 14:
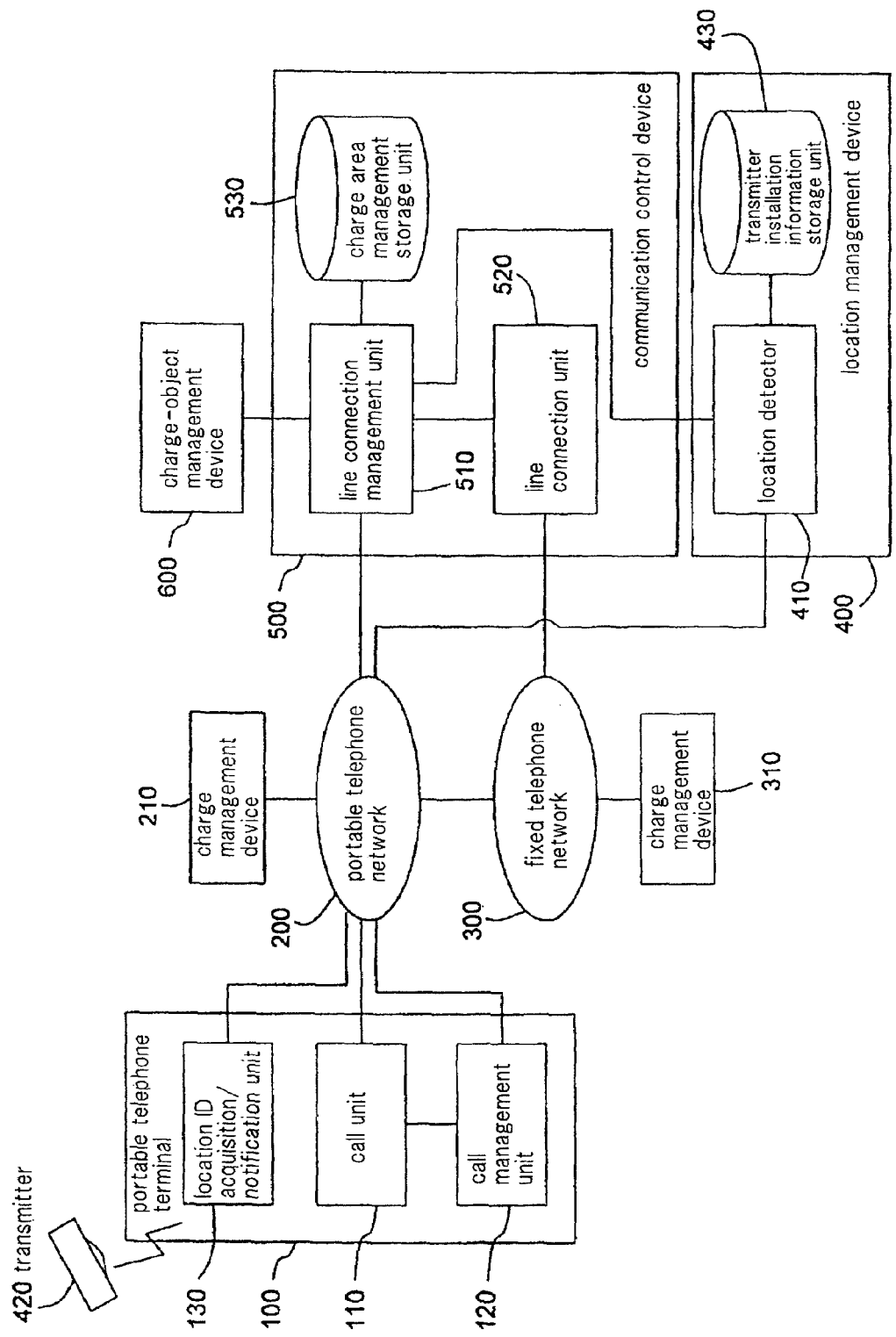
FIG. 14 shows an example of the system configuration in modification 1 of the first exemplary embodiment.

FIG. 14 is a block diagram showing the system configuration of the location-dependent charge control system in this modification 1. In FIG. 14, each device and functional unit having the same function as shown in FIG. 1 is given the same reference number and explanation of these parts is abbreviated.

The present modification 1 differs from the previously described exemplary embodiment in that location management device 400 is provided with location ID transmitter 420 that transmits a location ID by means of a radio signal such as infrared rays or radio waves and location ID acquisition/notification unit 130 is added to portable telephone terminal 100.

In FIG. 14, location management device 400 includes location detector 410, one or a plurality of location ID transmitters 420, and transmitter installation information storage unit 430.

Location ID transmitter 420 is installed in a location where location information of the user of portable telephone terminal 100 is required and broadcasts a location ID by a radio signal for identifying a particular location.

Transmitter installation information storage unit 430 manages the correspondence of the location ID transmitted by location ID transmitter 420 and the location information according to the installation location of location ID transmitter 420.

FIG. 15 is an explanatory view showing an example of transmitter installation location information storage unit 430.

As shown in the example of FIG. 15, the location information that corresponds to one location ID 4301 can be made to correspond to a plurality of notational formats such as logical information 4302, which is a name showing the actual location, coordinate information 4303 in a specific coordinate system such as longitude and latitude or the coordinates on a map, and zone information 4304 indicating ID number of specific zones.

On the other hand, location ID acquisition/notification unit 130 of portable telephone terminal 100 receives the location ID transmitted from transmitter 420 and reports this received location ID to location detector 410.

Location detector 410 acquires location information of the user of portable telephone terminal 100 that is specified in this location ID from transmitter installation information storage unit 430.

In this way, location management device 400 in this modification 1 acquires the location information of portable telephone terminal 100 by specifying the location of installation of transmitter 420 that is transmitting the location ID received by portable telephone terminal 100.

Explanation next regards the flow of processing in this modification 1 with reference to the figures.

Figure 16:
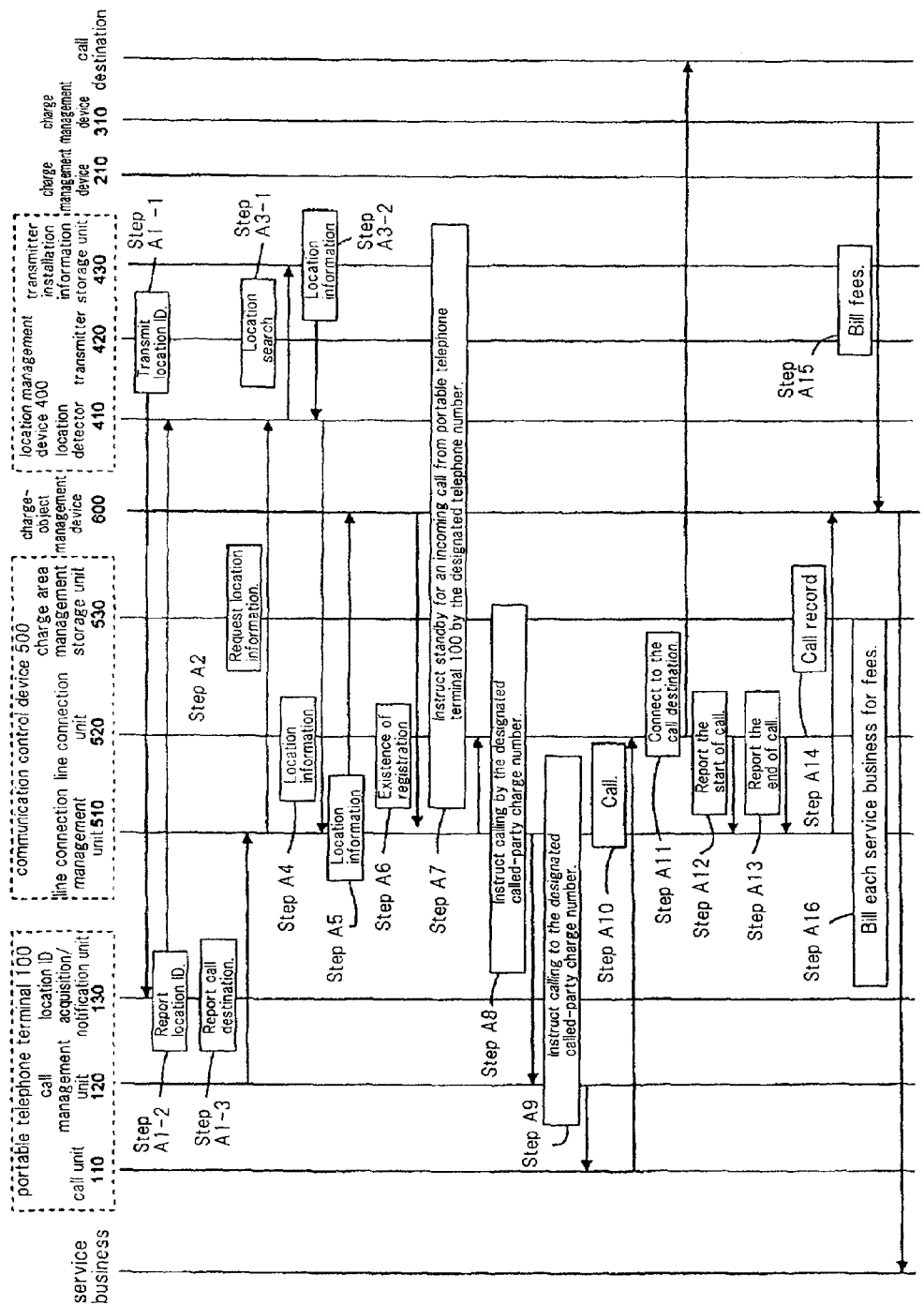
FIG. 16 shows an example of the overall flow of processing in modification 1 of the first exemplary embodiment.
Figure 17:
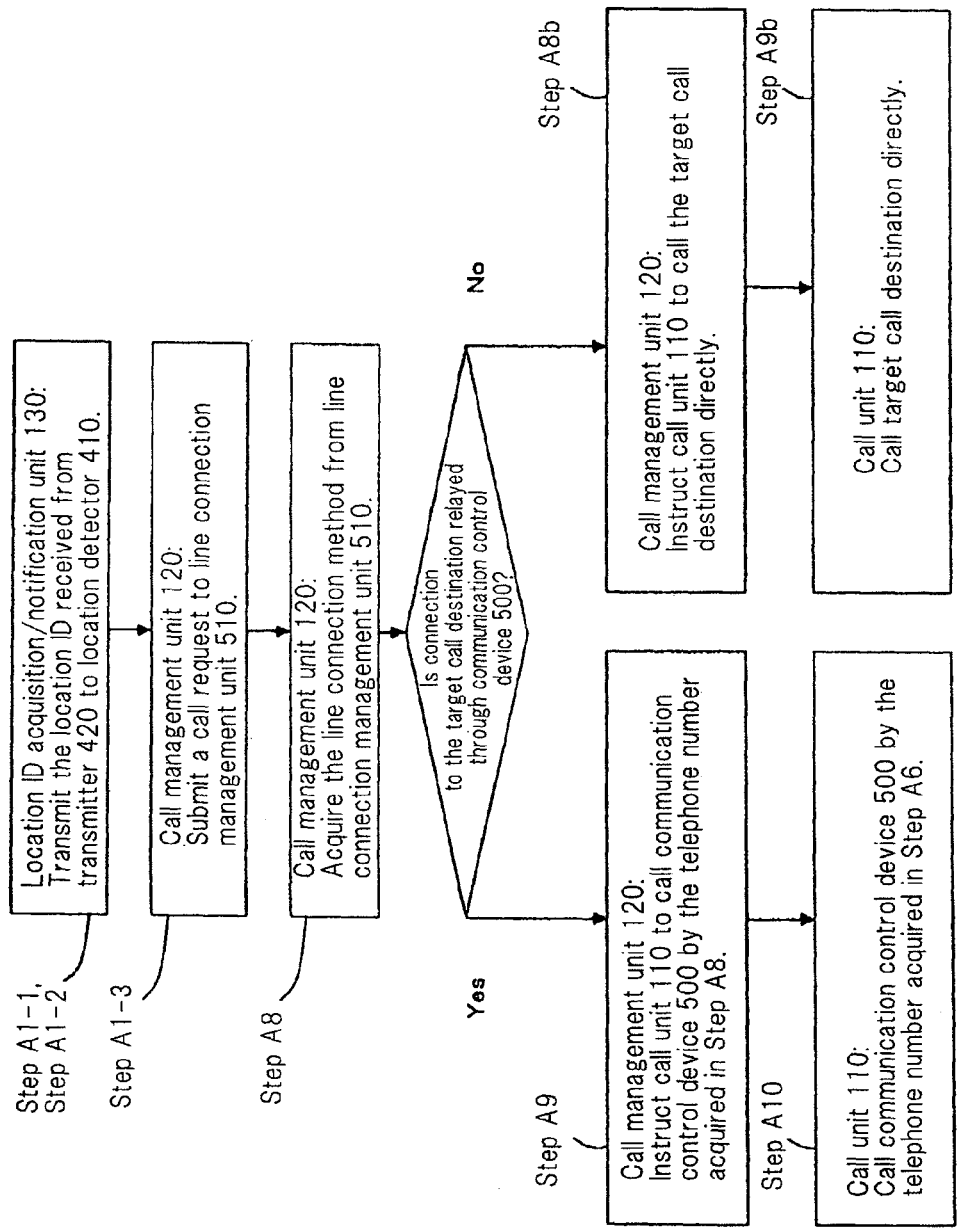
FIG. 17 is a flow chart showing an example of the operations of the portable telephone terminal in modification 1 of the first exemplary embodiment.
Figure 18:
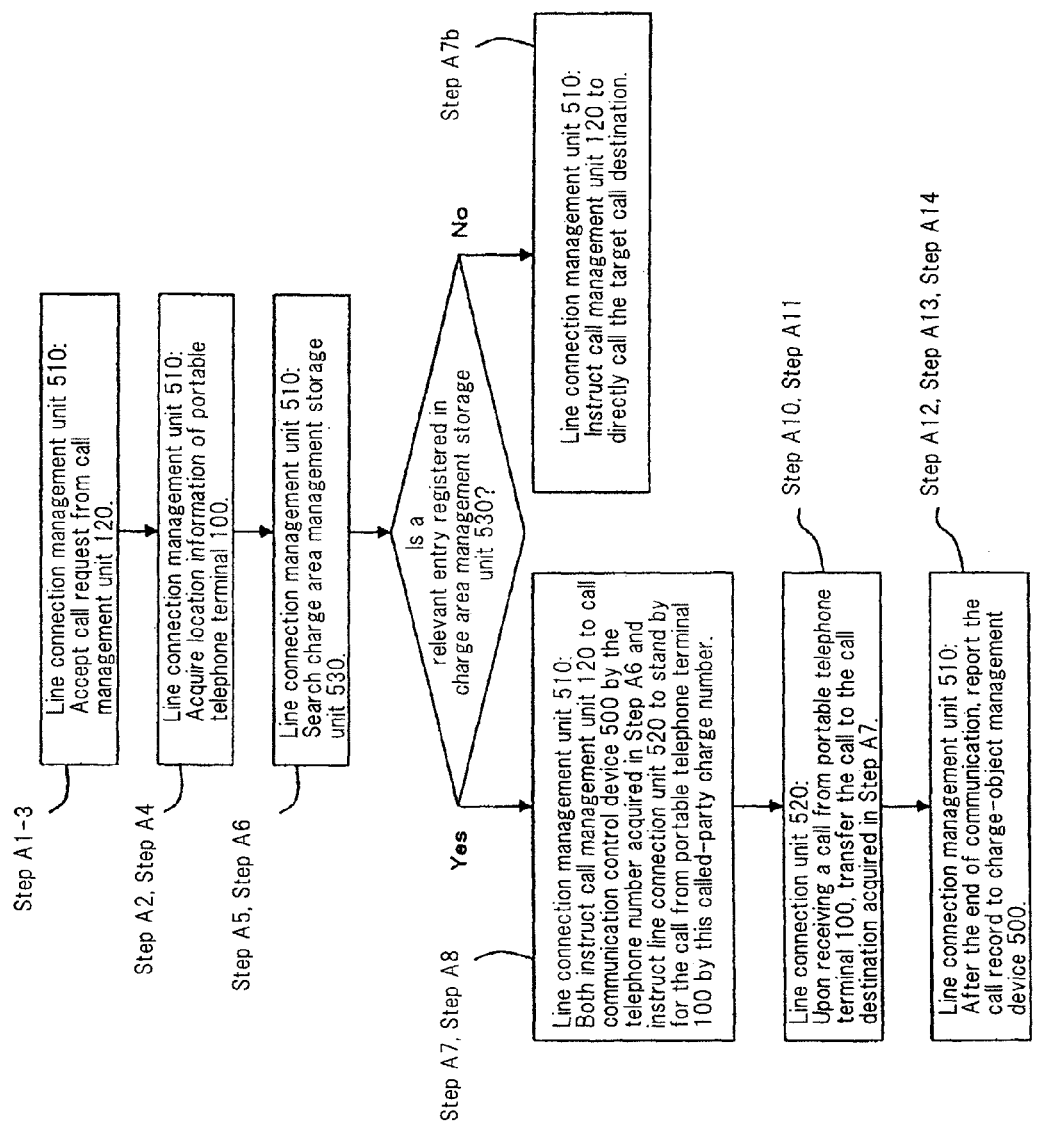
FIG. 18 is a flow chart showing an example of the operations of the communication control device in modification 1 of the first exemplary embodiment.

FIG. 16 is a sequence chart for explaining the overall operations in this modification 1. In addition, FIG. 17 is a flow chart for explaining the flow of operations of portable telephone terminal 100, and FIG. 18 is a flow chart for explaining the flow of operations of communication control device 500.

Parts that are identical to the previously described embodiment are given the same reference numbers, and explanation of these parts is omitted.

First, location ID acquisition/notification unit 130 of portable telephone terminal 100 acquires the location ID transmitted from transmitter 420 that is installed in the vicinity and reports the location ID to location detector 410 (Steps A1-1 and A1-2).

Call management unit 120 next reports a call request to line connection management unit 510 in Step A1-3, and upon receiving the call request, line connection unit 520 submits a request to location detector 410 for location information (Step A2)

Upon being requested the location information, location detector 410 carries out a position-measurement process for acquiring from transmitter installation information storage unit 430 the location information of the user of portable telephone terminal 100 that was specified in the location ID reported from location ID acquisition/notification unit 130 (Steps A3-1 and A3-2). Location detector 410 then reports the location information of portable telephone terminal 100 to line connection management unit 510 (Step A4).

In the example of transmitter installation information storage unit 430 shown in FIG. 15, when the location ID transmitted from transmitter 420 in Step A1-1 and then reported from location ID acquisition/notification unit 130 of portable telephone terminal 100 is "01010011," the location information of portable telephone terminal 100 that is specified by location detector 410 is the information "business facilities A south area" in logical information, "X=50, Y=15, Z=5" in coordinate information, and "zone ID=5" in zone information.

These items of information are reported to line connection management unit 510 as the location information of portable telephone terminal 100 in Step A4.

However, it is possible to acquire only the location information of the necessary notational format by designating during the location search of Step A3-1 only a specific item from among these notational formats of the location information.

In addition, when the request for location information is reported to location detector 410 from line connection management unit 510 in the above-described flow of operations, the processes of Step A3-1 and Step A3-2 are carried out, but the location information of portable telephone terminal 100 may also be found before the processes of Step A3-1 and Step A3-2 are carried out immediately following the process of Step A1-2 and before the request for location information of Step A2 is reported.

The operations following the above-described position-measurement process are identical to Steps A5-A11 of the previously-described first exemplary embodiment.

Modification 2

In the above-described first exemplary embodiment and modification 1 of this exemplary embodiment, a line connection method was shown for connecting a call from portable telephone terminal 100 to communication control device 500 using the called-party charge service telephone number of communication control device 500 when communication control device 500 relays portable telephone terminal 100 and the call destination.

In the present modification 2, in contrast, a call-back service is used when connecting a call between portable telephone terminal 100 and communication control device 500.

Figure 19:
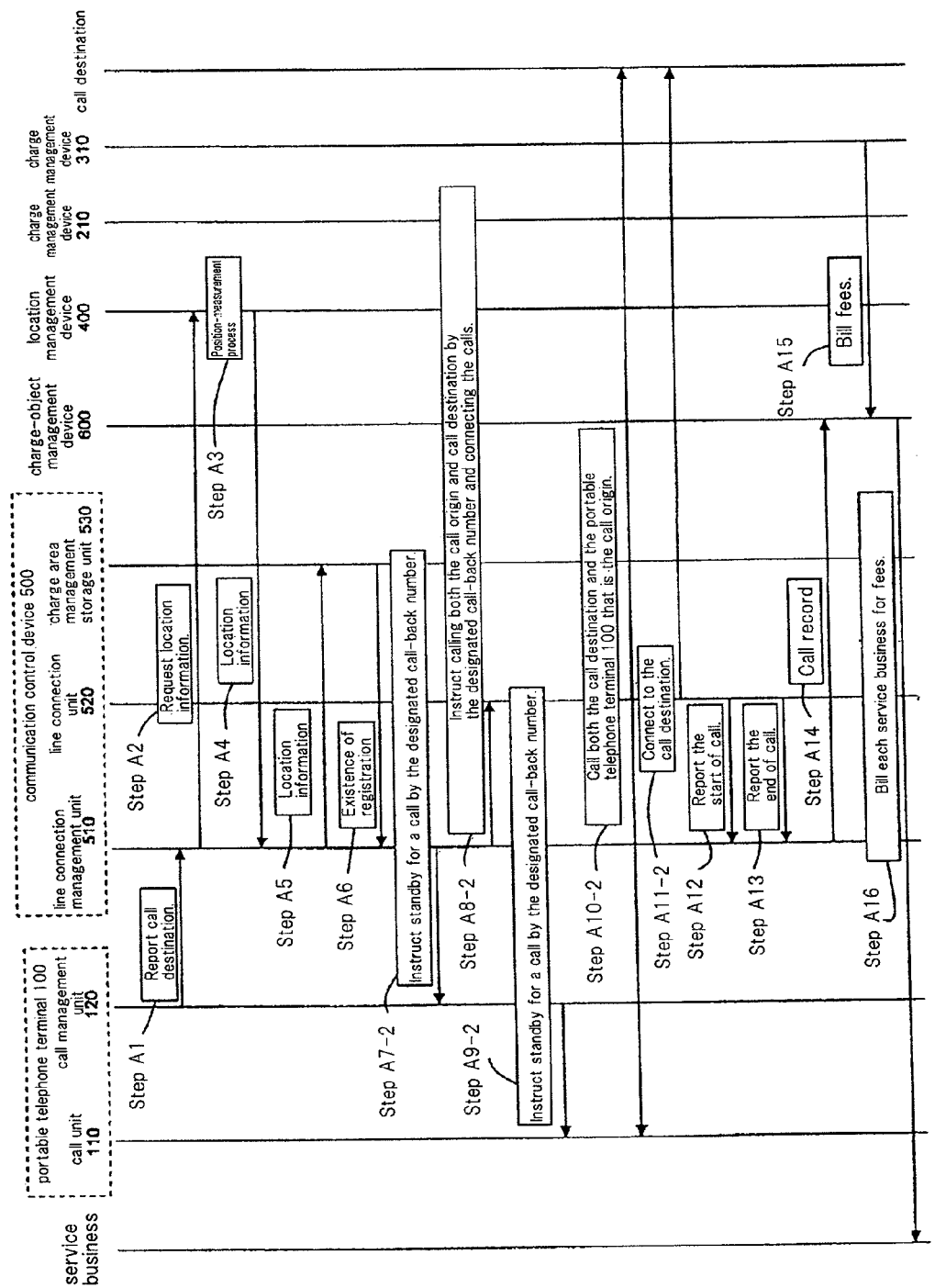
FIG. 19 shows an example of the overall flow of processing in modification 2 of the first exemplary embodiment.
Figure 20:
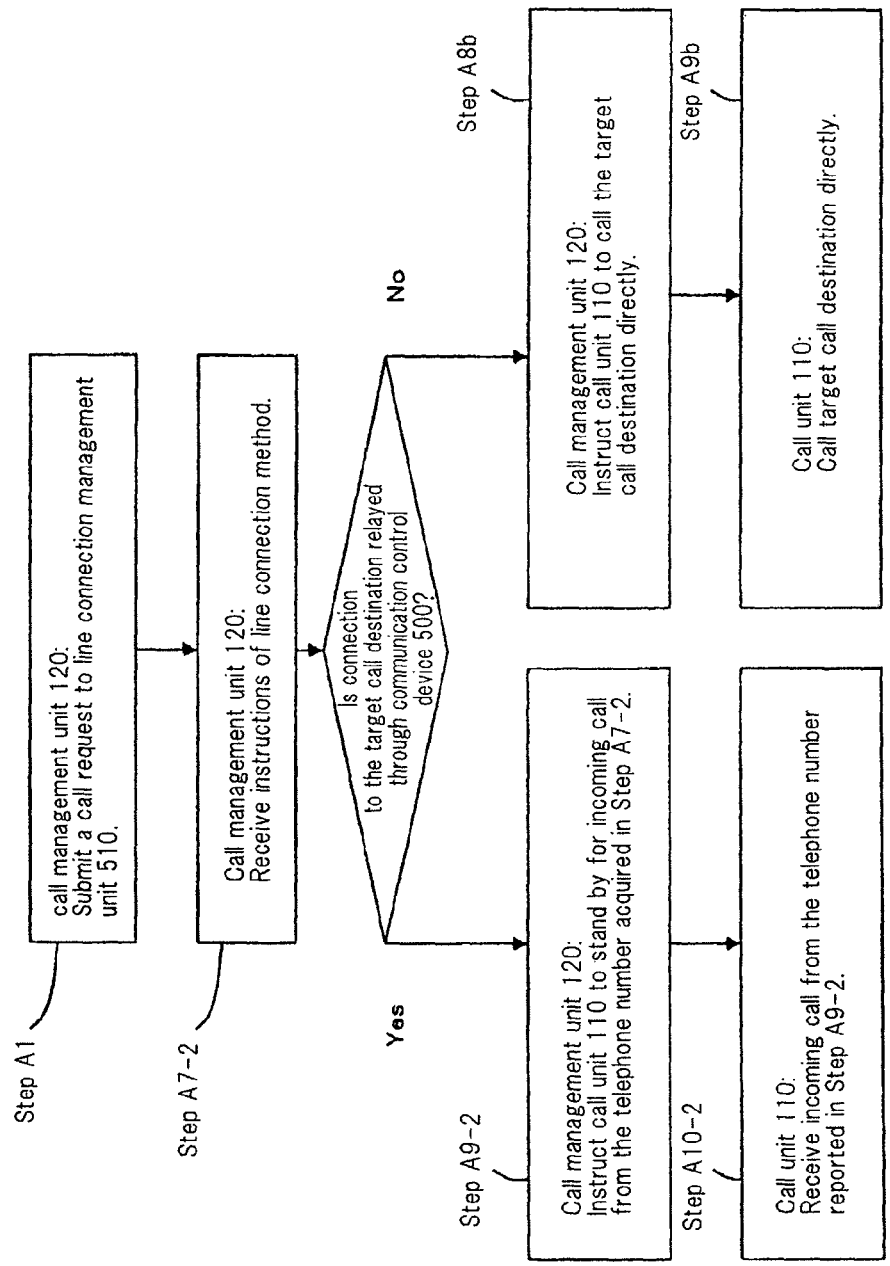
FIG. 20 is a flow chart showing an example of the operations of the portable telephone terminal in modification 2 of the first exemplary embodiment.
Figure 21:
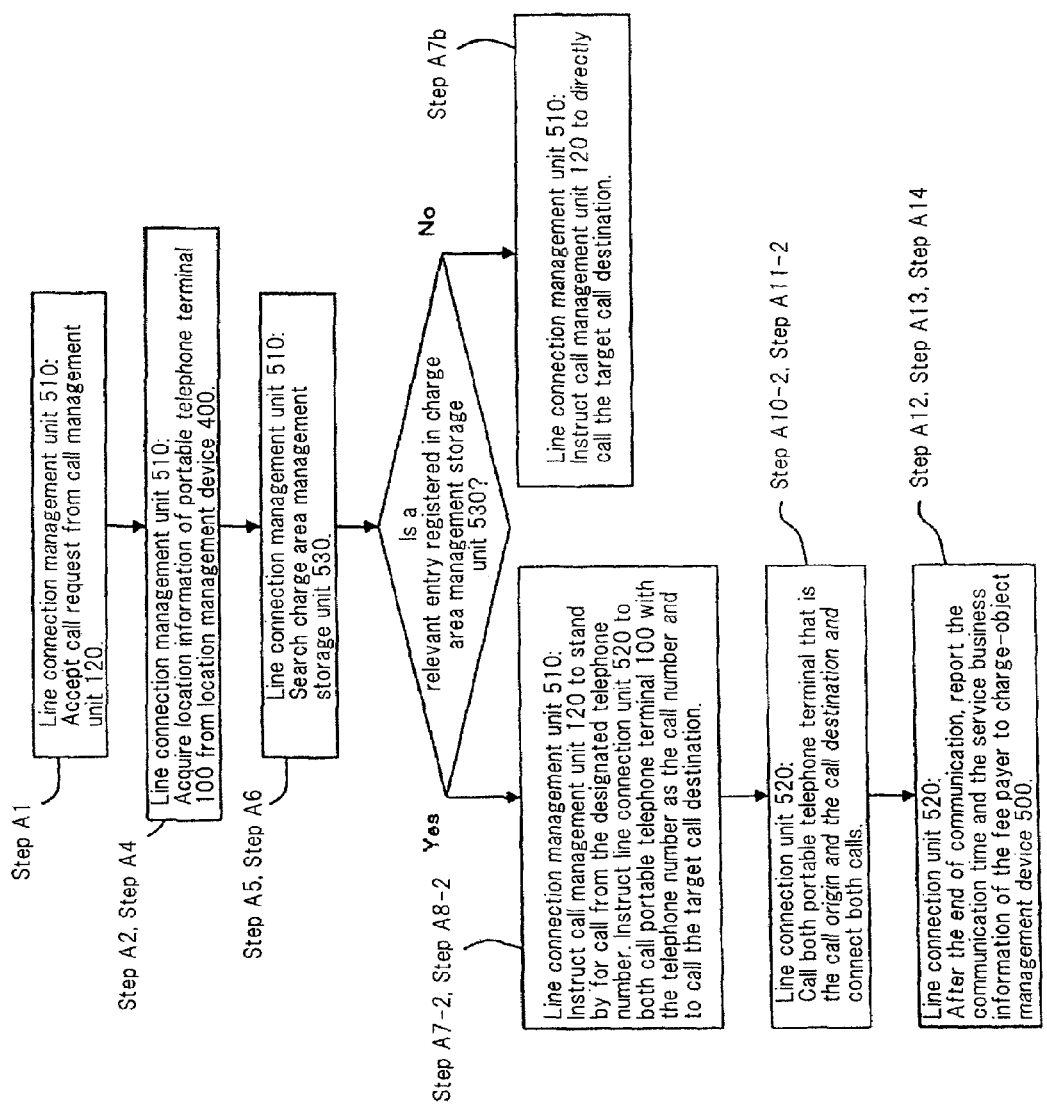
FIG. 21 is a flow chart showing an example of the operations of the communication control device in modification 2 of the first exemplary embodiment.

FIG. 19 is a sequence chart for explaining the overall operations of this modification 2. In addition, FIG. 20 is a flow chart for explaining the flow of processing in this modification 2 of portable telephone terminal 100, and FIG. 21 is a flow chart for explaining the flow of processing in this second modification of communication control device 500.

Parts that are identical to those of the previously described first exemplary embodiment are given the same reference numbers, and explanation of these parts is omitted.

In the above-described first exemplary embodiment, when portable telephone terminal 100 is connected to the call destination by relay through communication control device 500 in Steps A6-A11, a called-party charge number service is used such that charge management device 310 makes the object of charging of the communication fees that accompany this communication the administrator of communication control device 500 and not portable telephone terminal 100 that is the call origin.

In the present modification 2, in contrast, call-back is employed such that communication control device 500 calls both portable telephone terminal 100 that is the call origin and the call destination and then connects both calls, whereby charge management device 310 makes the object of charging of the communication fees that accompany this communication the administrator of communication control device 500.

In Step A6, line connection management unit 510 searches charge area management storage unit 530, and when it can be confirmed that the current location of portable telephone terminal 100 is registered in a service area, selects one telephone number that can be used from a plurality of call-back telephone numbers held by communication control device 500 (for example, line connection unit 520), and in Step A7-2, provides standby instructions to call unit 110 by way of call management unit 120 to stand by for a call from this telephone number.

However, as in the above-described first exemplary embodiment, when charge area management storage unit 530 also manages payer business information (see FIG. 6), line connection management unit 510 also simultaneously acquires payer business information in Step A6.

Line connection management unit 510 next provides line connection unit 520 with call instructions to both call portable telephone terminal 100 using the previously described telephone number as the call number and call the call destination of portable telephone terminal 100 that was acquired in Step A1 (Steps A7-2 and A8-2).

Line connection unit 520 next calls both portable telephone terminal 100 and the call destination by the method instructed in Step A8-2, and after confirming that both calls have been established, connects portable telephone terminal 100 and the call destination by connecting the two calls (Step A10-2 and Step A11-2).

Thus, in this modification, the line connection between portable telephone terminal 100 and communication control device 500 is achieved by calling portable telephone terminal 100 from communication control device 500 by call-back. As a result, the object of charging of charge management device 310 is the administrator of communication control device 500. In this modification 2, this point differs from the above-described first exemplary embodiment.

Modification 3

The above-described first exemplary embodiment and modification 1 and modification 2 of this exemplary embodiment are cases in which the information stored in charge area management storage unit 530 is as shown in FIG. 3 or FIG. 6, and the line connection method between portable telephone terminal 100 and the call destination realized by communication control device 500 does not depend on each object area and payer business.

In contrast, the present modification 3 is a case in which the configuration of information stored in charge area management storage unit 530 is as shown in FIG. 7, and the line connection method when portable telephone terminal 100 and the call destination are relayed through communication control device 500 depends on each object area and payer businesses.

Modification 3 differs from the above-described first exemplary embodiment and modification 1 and modification 2 of the first exemplary embodiment in that the information that is obtained by a search of charge area management storage unit 530 by line connection management unit 510 in Step A6 of FIG. 10, FIG. 16, and FIG. 19 includes, in addition to the payer business information of communication fees, information relating to the line connection method when communication control device 500 relays portable telephone terminal 100 and the call destination.

For example, under the condition that the information stored in charge area management storage unit 530 is the example of a configuration shown in FIG. 7, when the location information that line connection management unit 510 searches for in charge area management storage unit 530 in Step A5 is "business facilities A south area," line connection management unit 510 acquires from charge area management storage unit 530 in Step A6 both the payer business information and the line connection method that is recorded in line connection method 5344.

The remaining processing is identical to the processing of FIG. 10 or FIG. 16 with the exception of the use of "0120-111122" that is recorded in line connection method 5344 as the called-party charge telephone number.

Similarly, when the location information used when line connection management unit 510 searches charge area management storage unit 530 in Step A5 is "business facilities B north area," the remaining processing is identical to the processing of FIG. 19 as shown by the line connection method that is recorded in line connection method 5344 with the exception of the use of "03-1234-5678" as the telephone number for call-back.

Thus, in the present modification 3, the line connection method between portable telephone terminal 100 and the call destination can be altered by each object area and payer business.

Modification 4

As modification 4, explanation next regards the details of an exemplary embodiment for a case in which the configuration of information stored in charge area management storage unit 530 is shown in FIG. 8 with reference to the accompanying figures.

Figure 22:
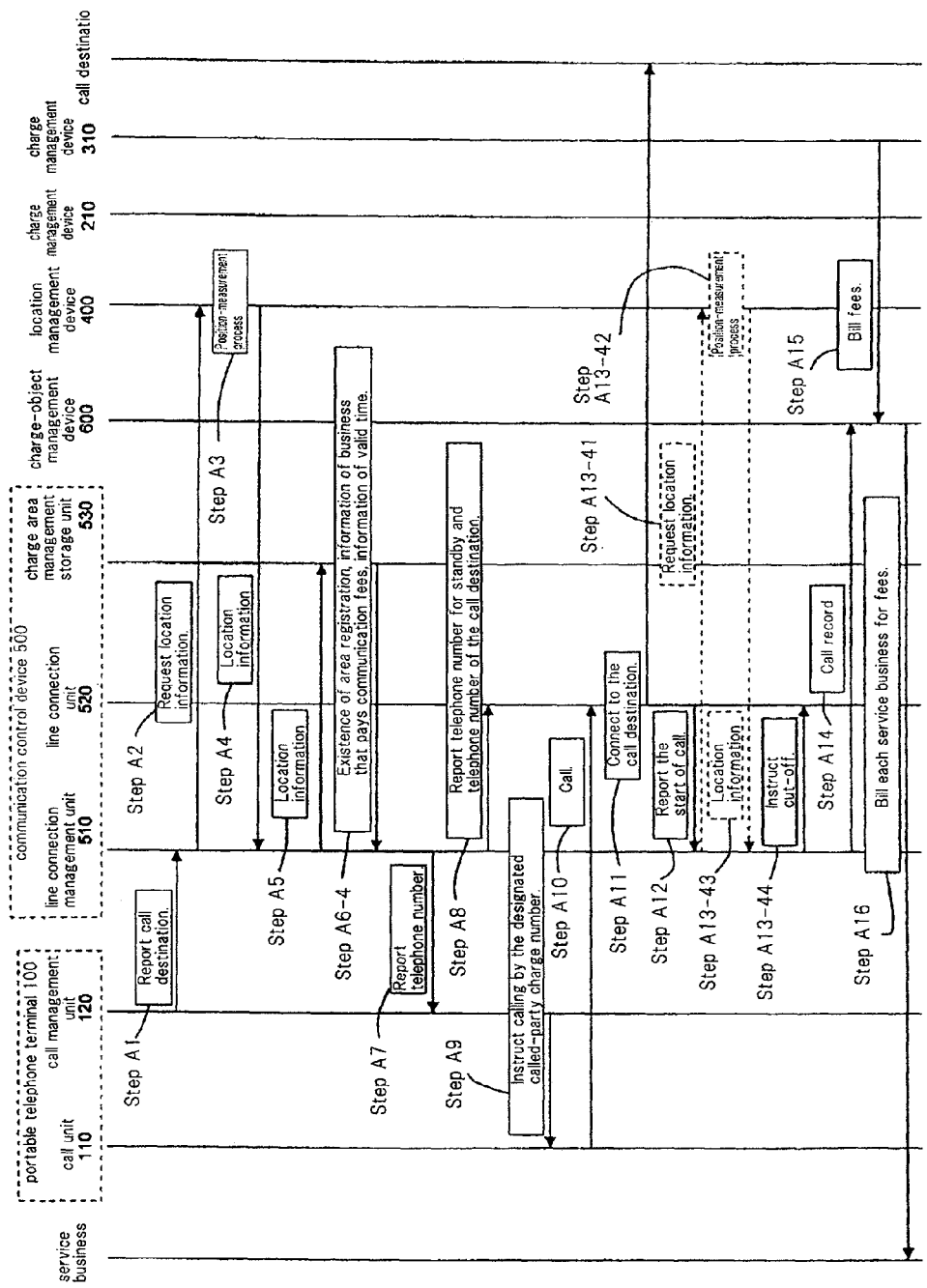
FIG. 22 shows an example of the overall flow of processing in modification 4 of the first exemplary embodiment.

FIG. 22 is a sequence chart for explaining the overall operations in modification 4. Parts that are equivalent to those of the above-described exemplary embodiment are given the same reference numbers and explanation of these parts will be omitted.

Modification 4 differs from the above-described first exemplary embodiment in that: in addition to the payer business information, line connection management unit 510 acquires from charge area management storage unit 530 in Step A6-4 valid time 5354 shown in the example of the configuration of charge area management storage unit 530 of FIG. 8; and the processes from Step A13-41 to Step A13-44 are added during Step A10 and Step A11 during communication between portable telephone terminal 100 and the call destination.

The position-measurement process of Step A13-42 and the process of Step A13-43 of reporting location information to line connection management unit 510 shown by broken lines in FIG. 22 are carried out cyclically or continuously during communication between portable telephone terminal 100 and the call destination.

When the location information acquired in Step A13-42 and Step A13-43 changes to information not relevant to the area information acquired in Step A6-4, line connection management unit 510 checks the valid time information acquired in Step A6-4 and notifies line connection unit 520 to cut off this communication upon the passage of the valid time interval from this change of the location information (Step A13-44).

In this modification 4, when portable telephone terminal 100 has gone outside the relevant service area during communication, line connection unit 520 limits the use outside the service area by limiting this communication to within a prescribed valid time interval that has been determined in advance.

In addition, communication may continue after the passage of the valid time, and regarding communication fees following the valid time, the service business or the location-dependent charge business, i.e., the administrator of communication control device 500, may first pay and then subsequently, the service business or the location-dependent charge service business may bill the user of portable telephone terminal 100.

A case can also be conceived in which the position-measurement process cannot be carried out depending on the position-measurement system that is applied in location management device 400 while portable telephone terminal 100 is engaged in communication. In such a case, the user of portable telephone terminal 100 can use communication for which the service business pays fees only for the time interval determined in advance in valid time 5354 of charge area management storage unit 530 regardless of whether portable telephone terminal 100 is present within the service area or not.

Explanation next regards the effects of the first exemplary embodiment and modification 1, modification 2, modification 3, and modification 4 of this exemplary embodiment.

According to the first exemplary embodiment and its modifications, the ability to use communication of a called-party charge number service or a call-back service that excuses payment of the communication fees of a portable telephone terminal user is controlled according to whether the current location of the user of portable telephone terminal 100 is within an area in which the service business pays for communication fees or not. The first exemplary embodiment and its modifications therefore enable real-time location-dependent charge control.

In addition, in the first exemplary embodiment, portable telephone terminal 100 is connected to the terminal of a communication partner with the communication control device 500 side as the payer of the communication fees of portable telephone terminal 100 only when the location of portable telephone terminal 100 is contained in a fee payment area indicated by data that are held in charge area management storage unit 530. As a result, the object of charging of the communication fees that accompany use of portable telephone terminal 100 can be changed according to the location of portable telephone terminal 100 during communication without depending on the communication business.

In addition, when portable telephone terminal 100 is present in a fee payment area, line connection management unit 500 both provides instructions to portable telephone terminal 100 to transmit to line connection unit 520 by a prescribed telephone number whereby the call-receiving side is charged and provides instructions to line connection unit 520 to accept a transmission from portable telephone terminal 100 by the prescribed telephone number and then connect the portable telephone terminal to the terminal of the communication partner.

In this case, the use of a prescribed telephone number whereby the receiving side is charged enables changing the object of charging of the communication fees that accompany use of portable telephone terminal 100 according to the location of portable telephone terminal 100 during communication without depending on a communication business.

In addition, when portable telephone terminal 100 is present in a fee payment area, line connection management unit 510 provides instructions to line connection unit 520 to transmit to both portable telephone terminal 100 and the terminal of the communication partner and then connect the portable telephone terminal and the terminal of the communication partner.

In this case, use of so-called call-back enables control of the object of charging of the communication fees that accompany use of a portable telephone terminal according to the location of the portable telephone terminal during communication without depending on the communication business.

In addition, line connection management unit 510 monitors the communication record between a portable telephone terminal and the terminal of a communication partner by way of line connection unit 520 and records this communication record and the business information that corresponds to the location of portable telephone terminal 400 that is acquired from location management device 400 in a charge-object management device.

In this case, the administrator of communication control device 500 is able to distribute and bill to each business the communication fees that are billed to the communication control device 500 side based on the communication record and business information that are recorded in charge-object management device 600.

Second Exemplary Embodiment

Explanation next regards the details regarding the second exemplary embodiment according to the present invention with reference to the accompanying figures.

The configuration of the second exemplary embodiment is basically the same as the configuration shown in FIG. 1. The following explanation focuses on points of the second exemplary embodiment that differ from the configuration shown in FIG. 1.

Figure 23:
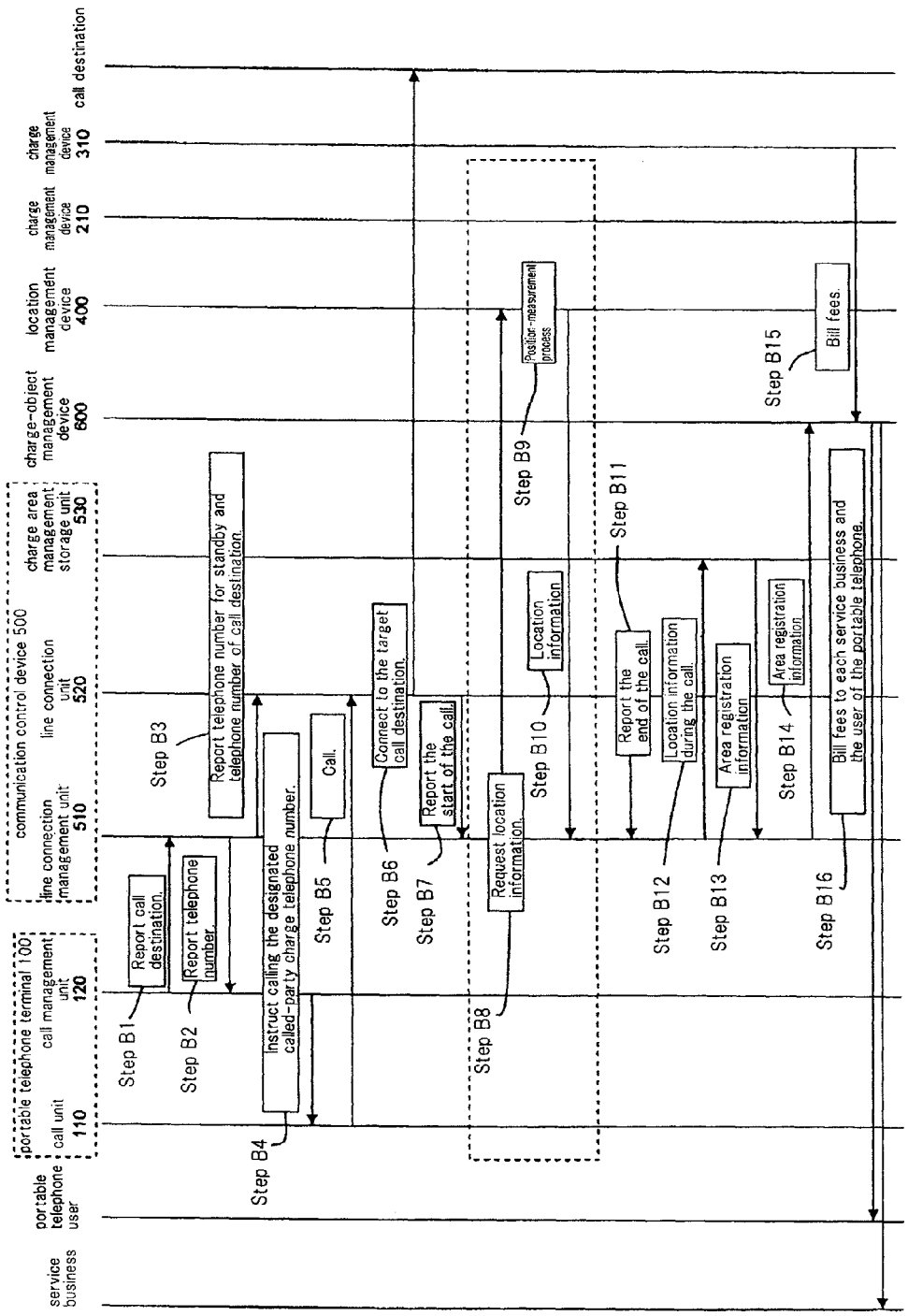
FIG. 23 shows an example of the overall flow of processing in the second exemplary embodiment.
Figure 24:
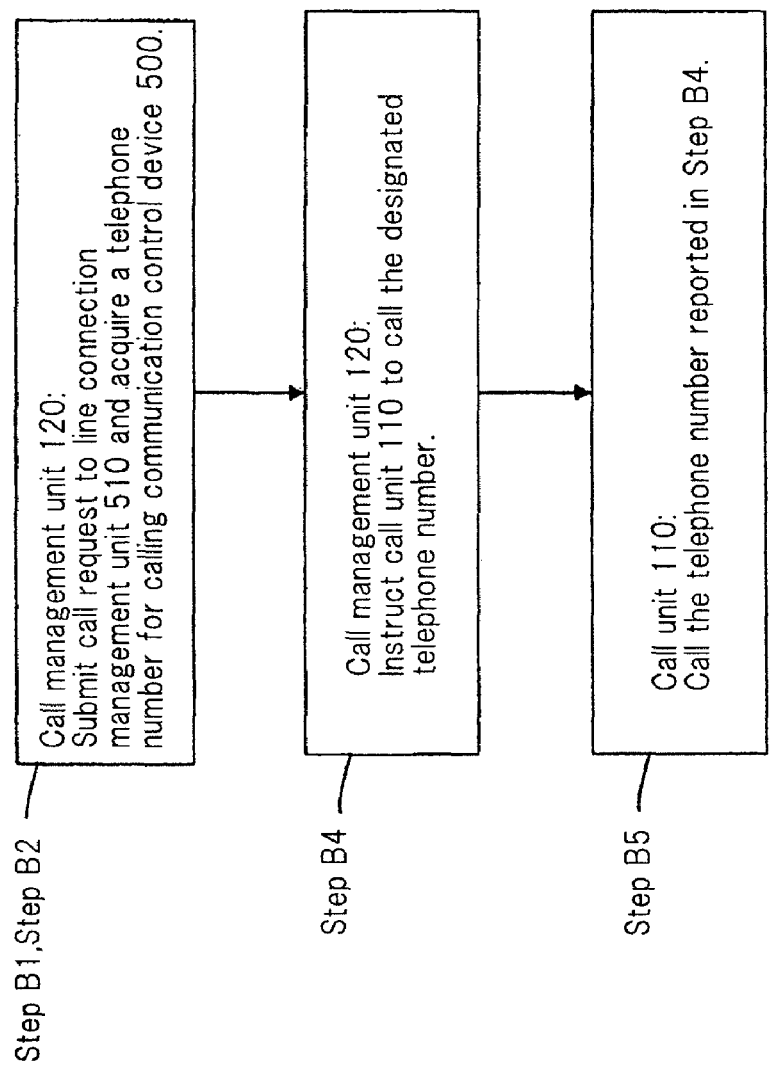
FIG. 24 is a flow chart showing an example of the operations of the portable telephone terminal of the second exemplary embodiment.
Figure 25:
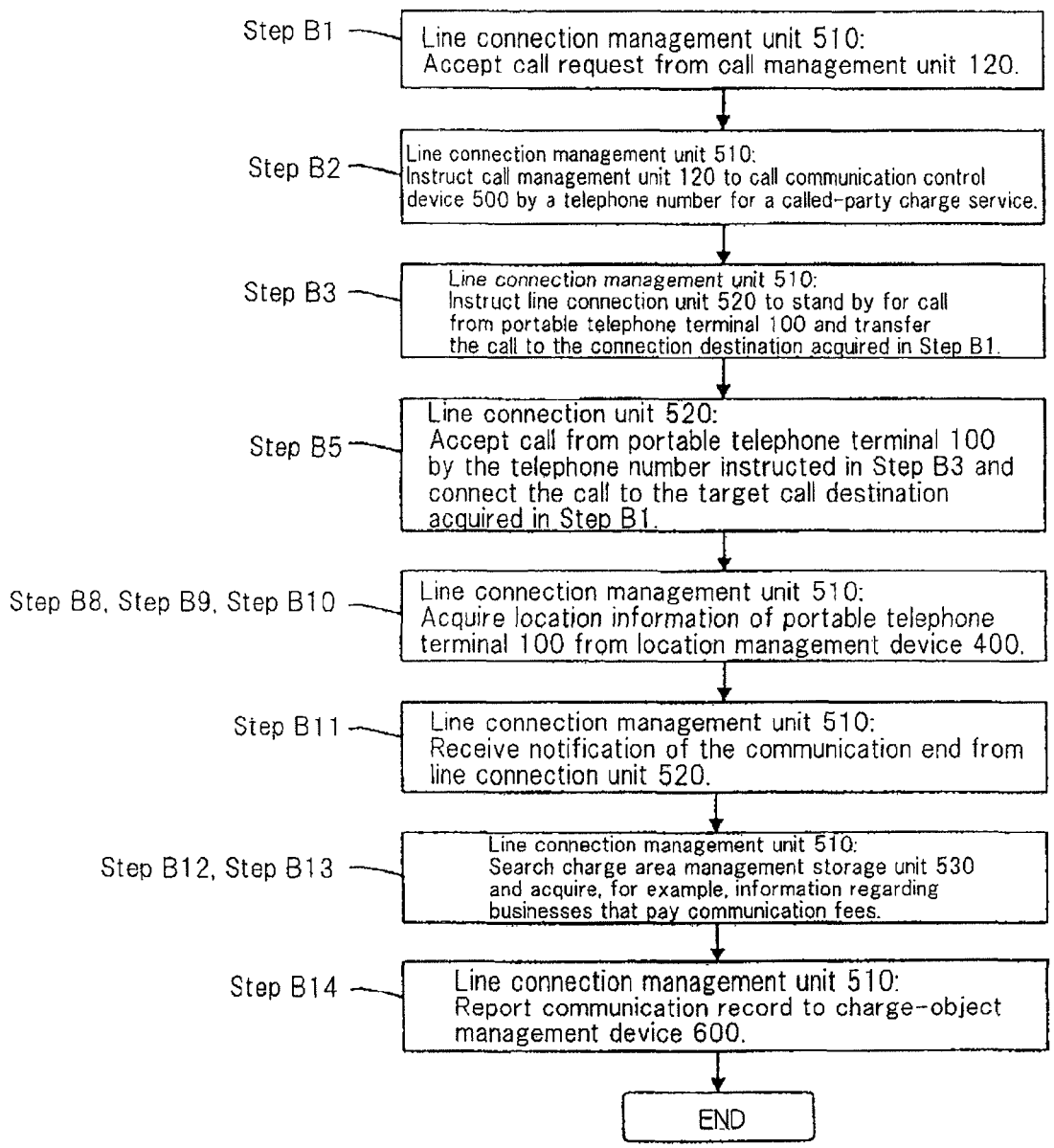
FIG. 25 is a flow chart showing an example of the operations of the communication control device of the second exemplary embodiment.

FIG. 23 is a sequence chart for explaining the overall operations of the second exemplary embodiment. In addition, FIG. 24 is a flow chart for explaining the flow of processing of portable telephone terminal 100, and FIG. 25 is a flow chart for explaining the flow of processing of communication control device 500.

Call management unit 120 of portable telephone terminal 100 first submits a call request to line connection management unit 510 of communication control device 500 and then reports the telephone number of the call destination and characteristic information of portable telephone terminal 100 (Step B1).

Line connection management unit 510, upon receiving the call request, selects one telephone number that can be used from among the telephone numbers for the called-party charge service that are held by communication control device 500.

Line connection management unit 510 both reports to call management unit 120 call instructions to call the selected telephone number and reports standby instructions to line connection unit 520 to stand by for a call from portable telephone terminal 100 by the selected called-party charge telephone number and transfer the call to the telephone number that was acquired in Step B1, this telephone number being the call destination (Steps B2 and B3).

Line connection management unit 510 further provides line connection unit 520 with characteristic information of portable telephone terminal 100 that was received in Step B1 together with the standby instructions.

Call management unit 120 of portable telephone terminal 100 next provides call unit 110 with call instructions to call the telephone number that was acquired in Step B2 (Step B4), and call unit 110 calls line connection unit 520 of communication control device 500 by the instructed telephone number (Step B5).

Here, when connecting the call to line connection unit 520, call unit 110 reports the characteristic information of portable telephone terminal 100 (for example, the telephone number of portable telephone terminal 100) to line connection unit 520. A service such as caller number notification that is provided by a communication business may be used for reporting the telephone number used as the characteristic information.

When receiving an incoming call, line connection unit 520 checks the characteristic information such as the telephone number or the terminal identifier of the terminal that is the call origin, and if this characteristic information matches the characteristic information such as the telephone number or terminal identifier that was reported in Step B3, line connection unit 520 connects the call to the call destination that was acquired in Step B3 (Step B6).

Next, when line connection unit 520 reports the communication start to line connection management unit 510 in Step B7, line connection management unit 510 requests location management device 400 for the location information of portable telephone terminal 100, and in accordance with this request, location management device 400 finds the location information of portable telephone terminal 100 and reports this location information to line connection management unit 510 (Steps B8, B9, and B10).

This processing of Steps B8-B10 may be carried out cyclically or continuously until line connection unit 520 reports the end of the call to line connection management unit 510 in Step B11.

Next, when the call ends, line connection management unit 510 uses the location information that was acquired to search charge area management storage unit 530, and in the area that corresponds to the acquired location, acquires registration information classified by area such as the businesses that pay communication fees, and registers this registration information that is classified by area in charge-object management device 600 together with the call record that records the area and the duration of the communication (Steps B11, B12, B13, and B14).

Under the condition that the information that is stored in charge area management storage unit 530 is of the configuration of FIG. 6, when the location information of portable telephone terminal 100 during communication that was acquired in Step B10 is contained in any entry of area information 5331, it is registered in charge-object management device 600 in Step B14 that the service business noted in the column of payer business 5332 of the relevant entry is to pay the communication fees.

However, when the location information of portable telephone terminal 100 changes during communication and the location information acquired in Step B10 changes to something that is not registered in any entry of area information 5331, it may be registered in charge-object management device 600 that the user of portable telephone terminal 100 is to pay the communication fees relating to the subsequent communication record.

In such cases, however, if the information that is stored in charge area management storage unit 530 is of the configuration of FIG. 8, even when the location information of portable telephone terminal 100 changes to something other than a service area, it is recorded in charge-object management device 600 that the relevant service business is to pay for the communication fees from the time that presence in a service area could last be confirmed up to the time interval described in the column of valid time 5354.

In other cases as well, information regarding the payment ratios of service businesses and the user of portable telephone terminal 100 may be included and classified by each area or by each payer business in charge area management storage unit 530, and in such a case, the payment ratio of each is recorded in charge-object management device 600 as the communication record.

Finally, charge management device 310 bills the administrator of communication control device 500 and not the user of portable telephone terminal 100 for the communication fees of communication that was relayed by communication control device 500.

The administrator of communication control device 500 then, based on the communication record recorded in charge-object management device 600 in Step B14, bills each service business for the communication fees of portable telephone terminal 100 in areas in which each service business pays and bills the user of portable telephone terminal 100 for the communication fees of portable telephone terminal 100 in areas other than payer areas (Steps B15 and B16).

However, when the payment ratios of communication fees are recorded in charge-object management device 600 as the communication record, the administrator of communication control device 500 may distribute and bill each service business and the user of portable telephone terminal 100 for the communication fees in service areas in accordance with the payment ratios.

Modification 1

In the above-described second exemplary embodiment, a called-party charge service in which charge management device 310 charges the administrator of communication control device 500 is used as the line connection method in which communication control device 500 relays portable telephone terminal 100 and call destination.

In this modification 1 of the second exemplary embodiment, an example is shown of using a call-back service in which a call is transmitted from communication control device 500 to portable telephone terminal 100 as the method of charging the communication fees to the administrator of communication control device 500.

Figure 26:
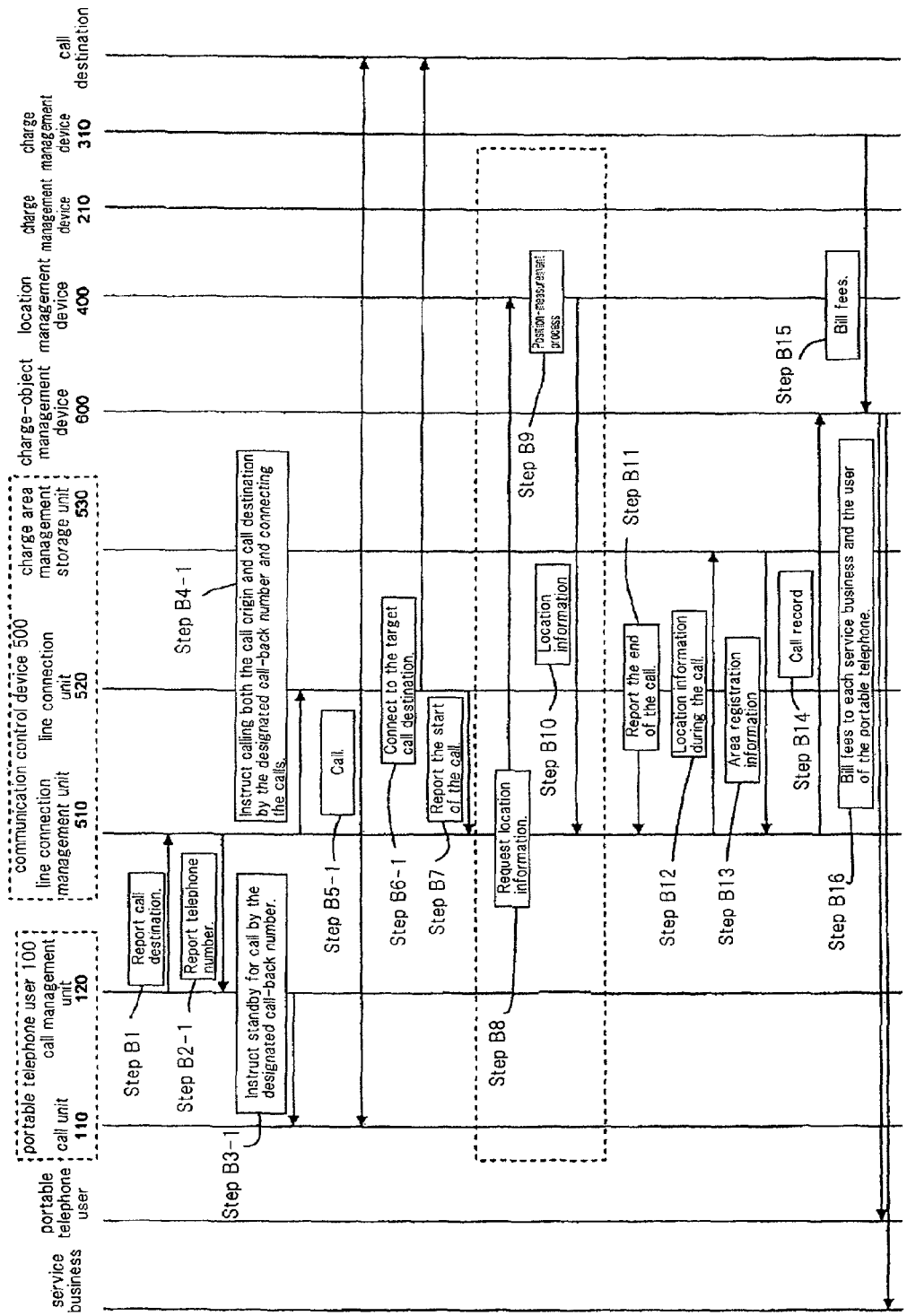
FIG. 26 shows an example of the overall flow of processing in modification 1 of the second exemplary embodiment.

FIG. 26 is a sequence chart for explaining the operations of this modification 1. Parts that are equivalent to the above-described second exemplary embodiment are given the same reference numbers, and explanation of these parts is omitted.

In the above-described second exemplary embodiment, a called-party charge number service is used when portable telephone terminal 100 calls communication control device 500 such that charge management device 310 makes the object of charging of the communication fees that accompany communication the administrator of communication control device 500 and not portable telephone terminal 100 that is the call origin in the steps from Step B1 to Step B6.

In contrast, in this modification 1, communication control device 500 uses call-back to call both portable telephone terminals 100 of the call origin and the call destination, and, by the connection of the two calls, the object of charging of the communication fees that accompany this communication becomes the administrator of communication control device 500.

Upon accepting a call request from call management unit 120 in Step B1, line connection management unit 510 selects one telephone number that can be used from a plurality of telephone numbers for call-back held by communication control device 500 and provides standby instructions to call unit 110 by way of call management unit 120 to stand by for a call from this telephone number (Steps B2-1 and B3-1).

Line connection management unit 510 next provides call instructions to line connection unit 520 to both call portable telephone terminal 100 with the previously described telephone number as the call number and to also call the call destination of portable telephone terminal 100 that was acquired in Step B1 (Step B4-1).

Line connection unit 520 next calls both portable telephone terminal 100 and the call destination by the method instructed in Step B4-1 and, after checking that both calls have been established, connects the two calls to connect portable telephone terminal 100 and the call destination (Step B5-1 and Step B6-1).

Thus, in the present modification, the line connection between portable telephone terminal 100 and communication control device 500 is achieved by using call-back to call portable telephone terminal 100 from communication control device 500.

As a result, the use of call-back in order for charge management device 310 to make the administrator of communication control device 500 the object of charging is the point of difference with the previously described second exemplary embodiment.

Explanation next regards the effects of the second exemplary embodiment and modification 1 of the second exemplary embodiment.

In the second exemplary embodiment and modification 1 of the second exemplary embodiment, by carrying out communication between portable telephone terminal 100 and the call destination by way of communication control device 500 regardless of the location of portable telephone terminal 100, the communication fees are first all billed to the administrator of communication control device 500 and then at a later time, the service business distributes and bills the communication fees within payer areas to each service business and the communication fees outside of payer areas to the user of the portable telephone terminal.

The adoption of this configuration allows, for example, different payment ratios to be set in each fee payment area and thus enables a more flexible charge control to be implemented. In addition, because there is no need to prepare a different line connection method for each service business, a location-dependent charge control service can be offered with fewer called-party charge number service or call-back service contracts.

According to the second exemplary embodiment, line, connection unit 520 connects portable telephone terminal 100 to the terminal of the communication partner while making the communication control device 500 side the payer of the communication fees of portable telephone terminal 100, and line connection management unit 510 records in charge-object management device 600 the communication record between portable telephone terminal 100 and the terminal of the communication partner by way of line connection unit 520 and the payer information that corresponds to the location at which portable telephone terminal 100 carries out communication.

As a result, the payer of the communication fees of portable telephone terminal 100 can be specified based on the information recorded in charge-object management device 600, whereby the object of charging of the communication fees that accompany use of a portable telephone terminal can be controlled according to the location of the portable telephone terminal during communication without depending on the communication business.

In addition, the administrator of communication control device 500 is able to bill the user of the portable telephone terminal for the communication fees that the user of portable telephone terminal 100 is to pay based on the information recorded in charge-object management device 600.

In addition, upon accepting a communication request from portable telephone terminal 100, line connection management unit 510 both provides instructions to portable telephone terminal 100 to transmit to line connection unit 520 by a prescribed telephone number by which the incoming side is charged and provides instructions to line connection unit 520 to accept the transmission from portable telephone terminal 100 by the prescribed telephone number and then connect portable telephone terminal 100 to the terminal of the communication partner.

In this case, the use of a prescribed telephone number by which the receiving side is charged enables changing the object of charging of the communication fees that accompany use of portable telephone terminal 100 according to the location of portable telephone terminal 100 during communication without depending on the communication business.

In addition, upon accepting a communication request from portable telephone terminal 100, line connection management unit 510 provides instructions to line connection unit 520 to transmit to both portable telephone terminal 100 and the communication partner and then connect portable telephone terminal 100 and the terminal of the communication partner.

In this case, the use of the so-called call-back enables changing the object of charging of the communication fees that accompany use of portable telephone terminal 100 according to the location of portable telephone terminal 100 during communication without depending on the communication business.

In addition, charge area management storage unit 530 holds business information for specifying the business that pays the communication fees of portable telephone terminal 100.

In this case, by using the communication record and business information that are recorded in charge-object management device 600, the administrator of communication control device 500 is able to distribute and bill each business for the communication fees that accompany use of portable telephone terminal 100 in locations that are registered in charge area management storage unit 530 and bill the user of portable telephone terminal 100 for communication fees in other locations.

In addition, line connection management unit 510 records in charge-object management device 600 the communication that follows a valid time and that uses line connection unit 520 as communication that is billed to the user of portable telephone terminal 100.

In this case, the administrator of communication control device 500 is able to bill the user of portable telephone terminal 100 for communication fees that follow the valid time based on information that is recorded in charge-object management device 600.

In addition, charge area management storage Unit 530 holds, in correspondence with the location of portable telephone terminal 100 or business information, the payment ratios of the user of a portable telephone terminal and businesses for communication fees, and line connection management unit 510 records in charge-object management device 600 the payment ratios that correspond to the location of the portable telephone terminal together with the communication record.

In this case, based on the communication record and payment ratios that are recorded in charge-object management device 600, the administrator of communication control device 500 is able to distribute and bill each business and the user of the portable telephone terminal for the communication fees that are billed to the communication control device 500 side.

Third Exemplary Embodiment

Explanation next regards the details of the third exemplary embodiment according to the present invention with reference to the accompanying figures.

The configuration of the third exemplary embodiment is basically equivalent to the configuration shown in FIG. 1. The following explanation focuses on points of difference between the third exemplary embodiment and the configuration shown in FIG. 1.

Figure 27:
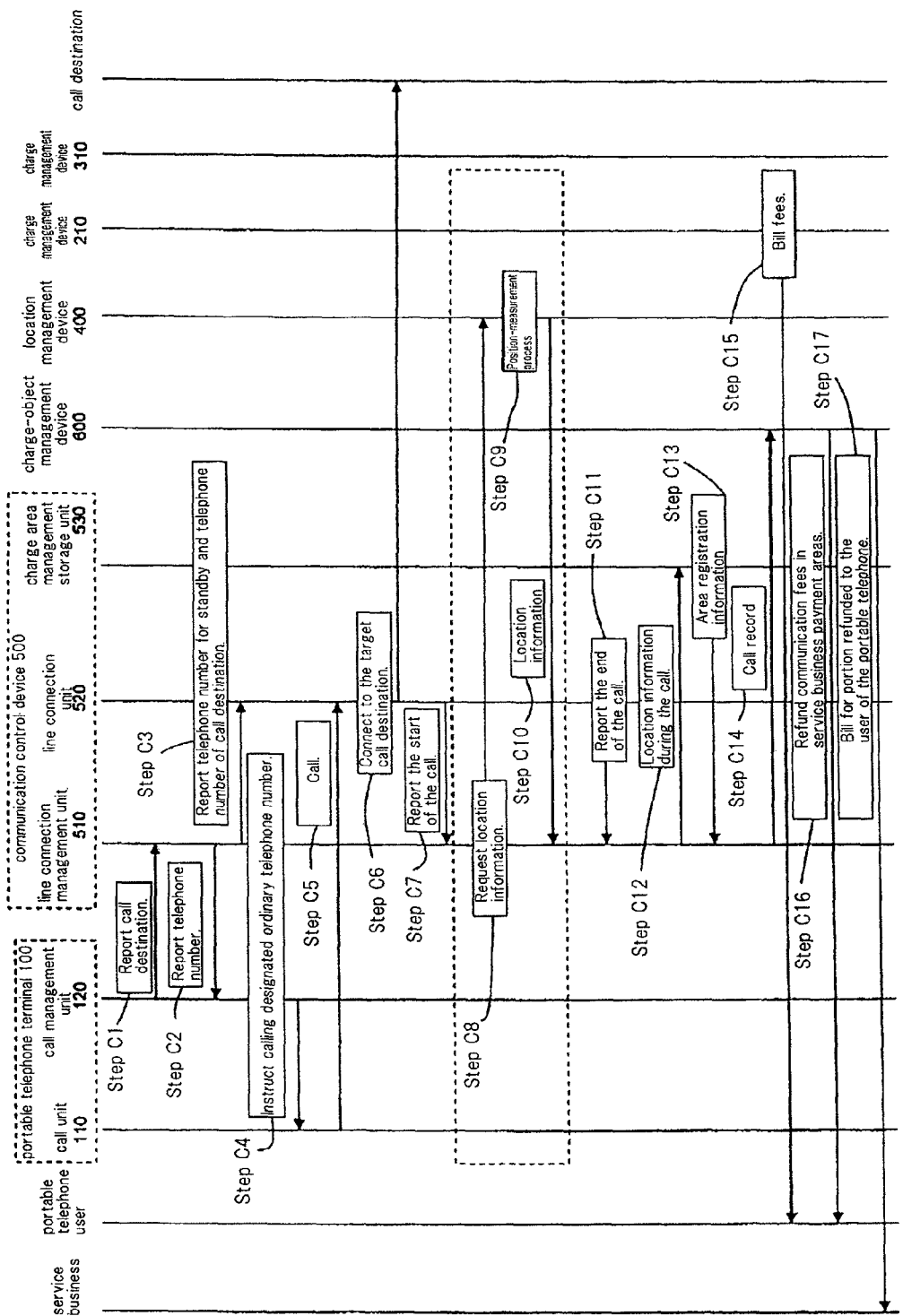
FIG. 27 shows an example of the overall flow of processing in the third exemplary embodiment.

FIG. 27 is a sequence chart for explaining the operations of the third exemplary embodiment.

In FIG. 27, the processes from Step C1 to C14 are processes that correspond to Steps B1-B14 of the operations in the second exemplary embodiment shown in FIG. 23.

In the third exemplary embodiment, the processes that differ from the second exemplary embodiment are the processes of Steps C2-C5 and Steps C15-C14. The following explanation focuses on the points of difference with the second exemplary embodiment.

In Steps B2-B5 of the second exemplary embodiment, a telephone numbers of a called-party charge number service or call-back service were used in calls from portable telephone terminal 100 to communication control device 500 whereby the administrator of communication control device 500 was charged.

In contrast, in Steps C2-C5 of the third exemplary embodiment that correspond to these steps, a normal telephone number by which the user of portable telephone terminal 100, i.e., the call origination side, is charged is used in calls from portable telephone terminal 100 to communication control device 500. As a result, the third exemplary embodiment differs from the second exemplary embodiment in that charge management device 210 makes the object of charging of the communication fees that accompany the use of portable telephone terminal 100 the user of portable telephone terminal 100 regardless of the location information of portable telephone terminal 100.

In addition, in Step B16 of the second exemplary embodiment, the administrator of communication control device 500 refers to charge-object management device 600 to distribute and bill to each service business and the user of portable telephone terminal 100 the communication fees of portable telephone terminal 100 that are billed from charge management device 310.

In contrast, in Step C15 of the third exemplary embodiment, the communication fees are all billed to the user of portable telephone terminal 100 from charge management device 210 of portable telephone network 200 because portable telephone terminal 100 calls communication control device 500 in Step C5 by a normal telephone number by which the origination side is charged.

The communication fees in an area in which a service business pays are adjusted in the location-dependent charge service business that holds charge-object management device 600 based on the communication record obtained in Step C14, and the location-dependent charge service business first pays the portable telephone terminal user (Step C16).

Regarding the portion that the location-dependent charging service business pays to the portable telephone terminal user in Step C16, the location-dependent charging service business bills each service business based on the communication record registered in charge-object management device 600 (Step C17).

The communication fees that are paid to the user of portable telephone terminal 100 in Step C16 need not be in the form of cash, but may be paid in the form of a coupon such as a product discount ticket or point tickets that are offered by each service business.

In other words, in the third exemplary embodiment, the user of portable telephone terminal 100 first pays all communication fees regardless of whether the location when portable telephone terminal 100 is used to realize communication is an area in which a service business pays communication fees or not, and then when squaring accounts, the portable telephone user receives refunds only for communication fees that accompany communication in areas in which service businesses pay.

Modification 1

In the third exemplary embodiment, the portable telephone user first pays all communication fees regardless of whether the location of portable telephone terminal 100 during communication is a service area in which each service business pays the communication fees of the user of the portable telephone terminal. Then, based on the communication record recorded in charge-object management device 600, the location-dependent charging service business subsequently acts on the behalf of each service business to make refunds to the portable telephone user regarding communication fees that accompany communication when in service areas in which service businesses pay.

In contrast, in modification 1 of the third exemplary embodiment, the administrators of communication control device 500 and charge-object management device 600 do not directly refund to the user of the portable telephone the communication fees in each service business payment area, but rather, only report to each service business information of the communication fees that must be returned to the user of the portable telephone. This point of modification 1 differs from the third embodiment.

Figure 28:
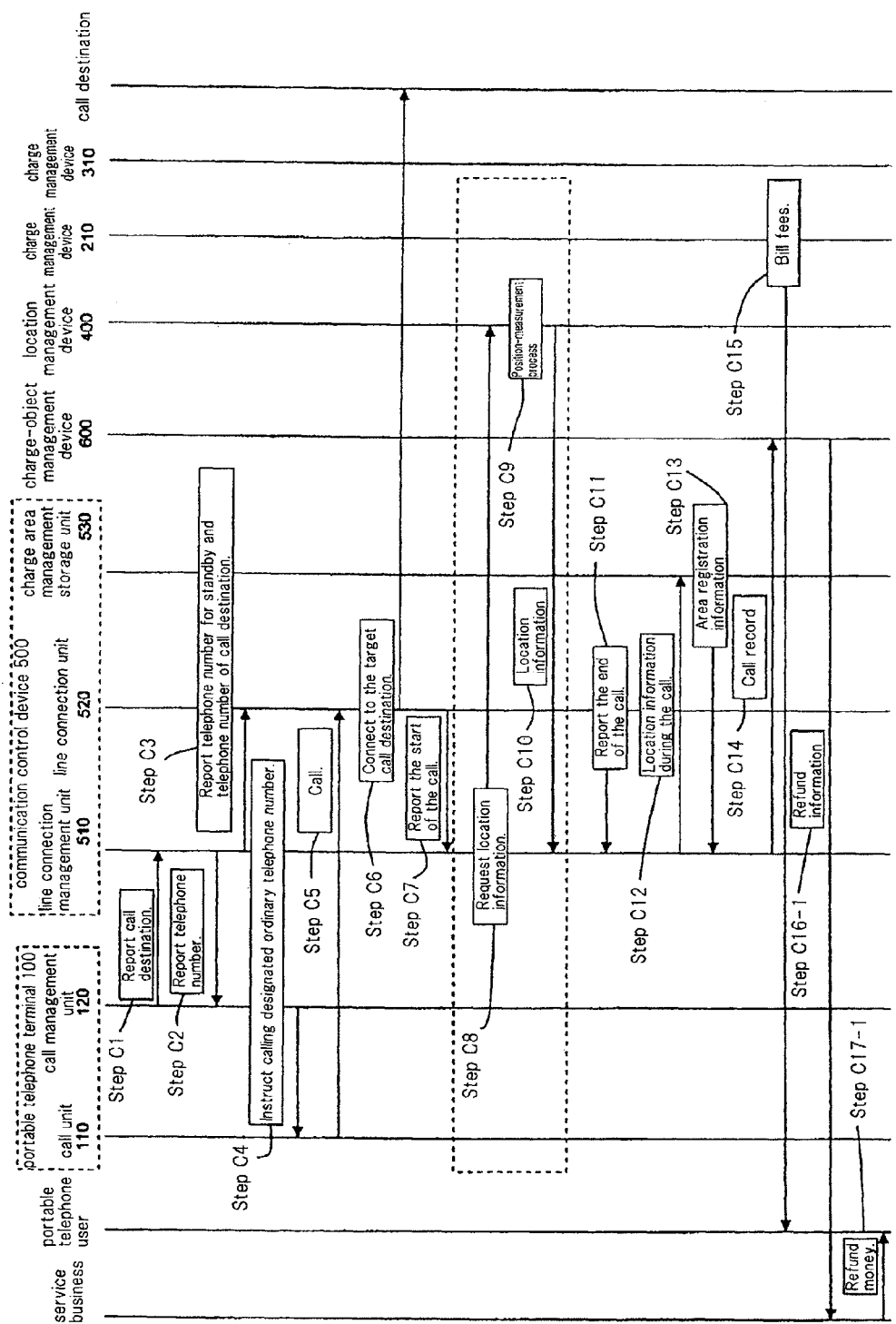
FIG. 28 shows an example of the overall flow of processing in modification 1 of the third exemplary embodiment.

FIG. 28 is a sequence chart for explaining the operations of modification 1.

In FIG. 28, parts that are equivalent to the third exemplary embodiment are given the same reference numbers and explanation is omitted regarding this parts.

In Step C16-1, the administrators of communication control device 500 and charge-object management device 600 do not directly refund to the user of the portable telephone the communication fees in each service business payment area, but rather, report to each service business only information regarding how much should be refunded to the user of the portable telephone.

Each service business that has received a report of information regarding refunds that should be made refunds to the user of portable telephone in Step C17-1 only the portion of the fees that were reported.

Explanation next regards the effects of the third exemplary embodiment and modification 1 of the third exemplary embodiment.

In the third exemplary embodiment and modification 1 of the exemplary embodiment, when portable telephone terminal 100 carries out communication with a call destination by way of communication control device 500, an ordinary telephone service is used in which the user of the portable telephone that is the call origin is charged. Accordingly, the location-dependent charge service business can realize a location-dependent charge control service without newly contracting services provided by communication businesses such as a called-party charge number service or call-back service.

According to the third exemplary embodiment, line connection unit 520 makes the payer of the communication fees of portable telephone terminal 100 the portable telephone terminal 100 side and connects portable telephone terminal 100 to the terminal of the communication partner, and line connection management unit 510 records in charge-object management device 600 the communication record between portable telephone terminal 100 and the terminal of the communication partner by way of line connection unit 520 and the payer information corresponding to the location at which portable telephone terminal 100 realized communication.

As a result, the payer of the communication fees of portable telephone terminal can be specified based on the information recorded in charge-object management device 600. The object of charging the communication fees that accompany use of portable telephone terminal 100 can therefore be controlled according to the location of portable telephone terminal 100 during communication without depending on communication businesses.

In addition, when the communication fees of the user of portable telephone terminal 100 are excused, the administrator of communication control device 500 can refund these communication fees based on the information recorded in charge-object management device 600.

Upon accepting a communication request from portable telephone terminal 100, line connection management unit 510 both provides instructions to portable telephone terminal 100 to transmit to line connection unit 520 by a specified telephone number by which the transmission side is charged and provides instructions to line connection unit 520 to receive the transmission from portable telephone terminal 100 by the specified telephone number and then connect portable telephone terminal 100 to the terminal of the communication partner.

In this case, the use of a specified telephone number enables line connection unit 520 to connect portable telephone terminal 100 with the terminal of the communication partner.

In addition, charge area management storage unit 530 holds business information for specifying the businesses that pay the communication fees of portable telephone terminal 100.

In this case, by using the communication record and the business information that are recorded in charge-object management device 600, the administrator of communication control device 500 is able to both refund to the user of portable telephone terminal 100 the communication fees that accompany use of portable telephone terminal 100 in locations that are registered in charge area management storage unit 530 and to distribute and bill to each business the communication fees that were refunded.

For example, the administrator of communication control device 500 can determine refund information indicating the amount that should be refunded to the user of portable telephone terminal 100 based on the information recorded in charge-object management device 600 and then distribute and report this refund information to each business; and each business can refund the communication fees to the user of portable telephone terminal 100 based on the refund information.

In addition, line connection management unit 510 records in charge-object management device 600 the communication that uses line connection unit 520 after the valid time as communication that is billed to the user of portable telephone terminal 100.

In this case, the administrator of communication control device 500 can make a refund to the user of portable telephone terminal 100 only for communication fees within the valid time based on the information recorded in charge-object management device 600.

In addition, charge area management storage unit 530 holds, in correspondence with the location of portable telephone terminal 100 or business information, the payment ratios of the user of portable telephone terminal 100 and businesses for communication fees, and line connection management unit 510 records the payment ratios that correspond to the location of portable telephone terminal 100 together with the communication record in charge-object management device 600.

In this case, the administrator of communication control device 500 or each business is able to refund communication fees to the user of portable telephone terminal 100 based on the communication record and payment ratio that are recorded in charge-object management device 600.

Fourth Exemplary Embodiment

Explanation next regards the details of the fourth exemplary embodiment with reference to the accompanying figures.

The configuration of the fourth exemplary embodiment is basically the same as the configuration shown in FIG. 1. The following explanation focuses on points of the fourth exemplary embodiment that differ from the configuration shown in FIG. 1.

Figure 29:
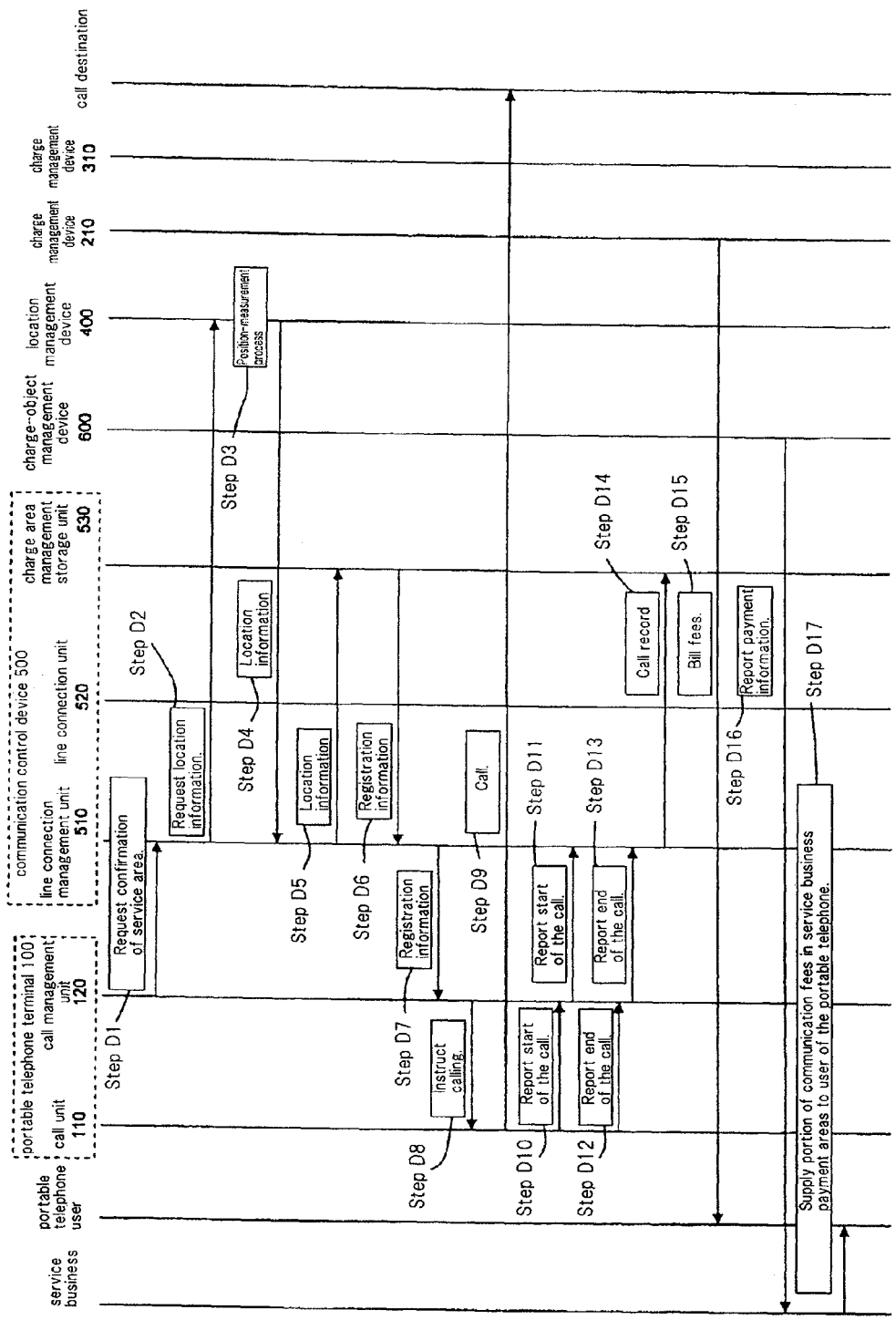
FIG. 29 shows an example of the overall flow of processing in the fourth exemplary embodiment.

FIG. 29 is a sequence chart for explaining the operations of the fourth exemplary embodiment.

First, before starting a call, call management unit 120 reports a confirmation request to line connection management unit 510 to check for presence in an area in which the location-dependent charging service can be used (Step D1).

Upon accepting this confirmation request, line connection management unit 510 next acquires location information of portable telephone terminal 100 from location management device 400 (Steps D2, D3, and D4) and then refers to charge area management storage unit 530 to check whether portable telephone terminal 100 is in a service area or not (Steps D5 and D6).

Line connection management unit 510 then reports to call management unit 120 whether portable telephone terminal 100 is in a service area or not (Step D7).

Call management unit 120 instructs call unit 110 to call only when it is confirmed in Step D7 that portable telephone terminal 100 is in a service area.

Upon receiving the instructions, call unit 110 calls the target call destination directly without going through communication control device 500 (Steps D8 and D9).

When it is confirmed that communication between portable telephone terminal 100 and the call destination has started, call unit 110 reports that communication has started to line connection management unit 510 by way of call management unit 120 (Steps D10 and D11).

Similarly, when communication with the call destination ends, call unit 110 reports that communication has ended to line connection management unit 510 by way of call management unit 120 (Steps D12 and D13).

Upon receiving notification of the end of communication, line connection management unit 510 registers information relating to the service area acquired in Step D6 and the communication time as the communication record in charge-object management device 600 (Step D14).

Even while portable telephone terminal 100 is in communication with the call destination, line connection management unit 510 may use location management device 400 to carry out the same processes as Step D2 to Step D4 to record the location information of portable telephone terminal 100 during communication, and upon acquiring the report of the end of communication, may register information regarding which service area portable telephone terminal 100 was in during communication and the communication time in each service area as calculation information in charge-object management device 600.

Finally, charge management device 210 bills the user of portable telephone terminal 100 for all of the communication fees that accompany use of the portable telephone.

On the other hand, the administrator of communication control device 500 or charge-object management device 600 reports to service businesses the communication fees that are to be paid by the service businesses, and the service businesses pay this amount to the user of portable telephone terminal 100 (Steps D15, D16, D17).

In other words, the fourth exemplary embodiment is the same as the third exemplary embodiment regarding the point that, regardless of whether the communication by portable telephone terminal 100 is in a service area, the user of the portable telephone first pays all communication fees, and service businesses later refund to the user of the portable telephone only those communication fees that accompany communication in service areas in which service businesses are to pay communication fees.

In the fourth exemplary embodiment, however, the call origin and call destination are directly connected without going through communication control device 500. On this point, the third exemplary embodiment differs from the fourth embodiment.

Explanation next regards the effects of the fourth exemplary embodiment.

In the fourth exemplary embodiment, the call origin and call destination communicate directly and not by way of communication control device 500. As a result, a location-dependent charge control service can be realized without newly requiring contracts for telephone numbers and exchanges for relay purposes.

According to the fourth exemplary embodiment, portable telephone terminal 100 connects with the terminal of the communication partner, line connection management unit 510 monitors the communication record between portable telephone terminal 100 and the terminal of the communication partner based on the communication start and communication end that are reported from portable telephone terminal 100, and records this communication record and payer information corresponding to the location at which communication is carried out by portable telephone terminal 100 in charge-object management device 600.

As a result, the payer of the communication fees of portable telephone terminal 100 can be specified based on the information recorded in charge-object management device 600, whereby the object of charging communication fees that accompany use of portable telephone terminal 100 can be controlled according to the location of portable telephone terminal 100 during communication without depending on the communication business.

When the communication fees of the user of portable telephone terminal 100 are excused, the administrator of communication control device 500 can refund the communication fees based on the information recorded in charge-object management device 600.

In addition, charge area management storage unit 530 holds business information for specifying businesses that are to pay the communication fees of portable telephone terminal 100.

In this case, the administrator of communication control device 500, based on the communication record and business information that are recorded in charge-object management device 600, is able to both refund the communication fees that accompany use of portable telephone terminal 100 in locations that are registered in charge area management storage unit 530 to the user of portable telephone terminal 100 and distribute and bill each business for the refunded communication fees.

In addition, the administrator of communication control device 500 can determine refund information that indicates the amount that should be refunded to the user of portable telephone terminal 100 based on the information recorded in charge-object management device 600 and can distribute and report this refund information to each business, and each business is able to refund the communication fees to the user of the portable telephone terminal based on the refund information.

In addition, line connection management unit 510 records in charge-object management device 600 communication that follows a valid time as communication that is to be billed to the user of portable telephone terminal 100.

In this case, based on the information recorded in charge-object management device 600, the administrator of communication control device 500 is able to make refunds to the user of portable telephone terminal 100 only with respect to communication fees within the valid time.

In addition, charge area management storage unit 530 holds, in correspondence with the location of portable telephone terminal 100 or business information, payment ratios of the user of a portable telephone terminal and businesses for communication fees, and line connection management unit 510 records in charge-object management device 600 the payment ratios that correspond to the location of portable telephone terminal 100 together with the communication record.

In this case, the administrator of communication control device 500 or each business is able to refund communication fees to the user of portable telephone terminal 100 based on the payment ratios and the communication record that are recorded in charge-object management device 600.

The following forms can be considered as forms of application of the present invention as described hereinabove.

As the first form of application, a form can be considered in which all of location management device 400, communication control device 500, and charge-object management device 600 are directly held by a service business that offers a location-dependent charge service in areas run by specific businesses to customers that are portable telephone users for the purpose of attracting customers.

As a second form of application, a form can be considered in which a service business holds location management device 400 and charge-object management device 600, and a third party that provides a location information service holds communication control device 500. In this form of application, a service business is able to provide a location-dependent charge service to users of portable telephones by acquiring location information of portable telephone users from the third party that provides the location information service.

As a third form of application, a form can be considered in which a service business does not have any of location management device 400, communication control device 500, or charge-object management device 600. In this form of application, these devices are maintained by a location-dependent charge service provider business that is a third party. The location-dependent charge service business is a form for providing each service business with a location-dependent charge service as an outsourced service or ASP service for enabling the provision of a location-dependent charge service to customers that visit each service area that is run by a service business.

As explained hereinabove, in each exemplary embodiment and each modification, absolutely no changes are made to the charge management device and charge service of an existing portable telephone network that is managed by communication businesses. Accordingly, a location-dependent charge service that switches the object of charges according to the location of a portable telephone user can be realized even by a business that does not administer a portable telephone network.

In each of the embodiments and modifications described hereinabove, the configuration shown in the figures are merely examples and do not in any way limit the configuration of the present invention.

UTILITY IN INDUSTRY

According to the present invention, a service business that runs a specific business can, by providing a service in which the communication fees of customers within a store are paid by the service business side, apply the present invention to such purposes as improving customer appeal.

In addition, when using personal portable telephones in business, the present invention can be applied for such purposes as limiting communication fees that are paid by a company according to locations such as the workplace or a work assignment.

The invention claimed is:

1. A communication control device capable of communicating with both a portable telephone terminal that transmits a communication request that designates a terminal of a communication partner and a location management device that specifies a location of said portable telephone terminal, said communication control device changing a payer of communication fees of said portable telephone terminal according to locations that are specified in said location management device; said communication control device comprising:
    a charge area management storage unit that holds data regarding fee payment areas in which a business that differs from a user of said portable telephone terminal pays the communication fees of said portable telephone terminal;
    a communication control unit that can connect said portable telephone terminal with the terminal of said communication partner while making the payer of the communication fees of said portable telephone terminal said communication control device side; and
    a communication management unit that, upon receiving said communication request from said portable telephone terminal, acquires the location of said portable telephone terminal from said location management device, and that provides said communication control unit with connection instructions directing connection of said portable telephone terminal with the terminal of said communication partner while making the payer of the communication fees of said portable telephone terminal said communication control device side only when the location of said portable telephone terminal is contained within said fee payment areas indicated by data held in said charge area management storage unit.

2. The communication control device according to claim 1, wherein:
    said communication control unit connects said portable telephone terminal with the terminal of said communication partner by way of a fixed telephone network; and
    said communication management unit provides said communication control unit with instructions to connect said portable telephone terminal to the terminal of said communication partner such that the communication fees of said portable telephone terminal are billed to said communication control device side from a charge system of said fixed telephone network only when the location of said portable telephone terminal is contained in said fee payment area indicated by data that are held in said charge area management storage unit.

3. The communication control device according to claim 1, wherein said communication management unit provides instructions to said portable telephone terminal to connect directly to the terminal of said communication partner without being relayed through said communication control unit when the location of said portable telephone terminal is not contained in said fee payment area indicated by data that are held in said charge area management storage unit.

4. The communication control device according to claim 2, wherein, when the location of said portable telephone terminal is contained in said fee payment area indicated by data that are held in said charge area management storage unit, said communication management unit both: supplies instructions to said portable telephone terminal to transmit to said communication control unit by a prescribed telephone number whereby the receiving side is charged, and provides instructions to said communication control unit to accept a transmission from said portable telephone terminal by said prescribed telephone number and then connect said portable telephone terminal to the terminal of said communication partner.

5. The communication control device according to claim 2, wherein, when the location of said portable telephone terminal is contained in said fee payment area indicated by data that are held in said charge area management storage unit, said communication management unit provides instructions to said communication control unit to transmit to both said portable telephone terminal and the terminal of said communication partner and then connect said portable telephone terminal to the terminal of said communication partner.

6. The communication control device according to claim 1, wherein:
    said communication control device can further communicate with a charge-object management device that records a communication record between said portable telephone terminal and the terminal of said communication partner,
    said charge area management storage unit holds, in correspondence with data for said fee payment areas, business information for specifying businesses that pay communication fees of said portable telephone terminal in said fee payment areas; and
    said communication management unit monitors the communication record between said portable telephone terminal and the terminal of said communication partner by way of said communication control unit and records, in said charge-object management device, the communication record and said business information that corresponds to the location of the portable telephone terminal that has been acquired from said location management device.

7. The communication control device according to claim 1, wherein:
    said charge area management storage unit holds, in correspondence with data regarding said fee payment areas, valid time information indicating valid time of communication for which communication fees of the user of said portable telephone terminal are excused in said fee payment areas; and
    said communication control unit limits communication between said portable telephone terminal and the terminal of said communication partner based on said valid time that corresponds to the location of the portable telephone terminal that has been acquired from said location management device.

8. The communication control device according to claim 1, wherein:
said location management device specifies a location of the terminal of said communication partner; and
said communication management unit acquires the location of the terminal of said communication partner from said location management device when said communication request from said portable telephone terminal has been accepted, and when the location of the terminal of said communication partner is contained in said fee payment area indicated by data that are held in said charge area management storage unit, provides instructions to said communication control unit to connect said portable telephone terminal with the terminal of said communication partner while making said communication control device side the payer of communication fees of said portable telephone terminal.

9. The communication control device according to claim 4, wherein:
said charge area management storage unit holds, in correspondence with data regarding said fee payment areas, business information for specifying businesses that pay communication fees of said portable telephone terminal in said fee payment areas, and telephone numbers used when said communication control unit relays communication of said portable telephone terminal and the terminal of said communication partner; and
said communication management unit changes the telephone number used when said communication control unit relays communication between said portable telephone terminal and the terminal of said communication partner according to the location of said portable telephone terminal or according to said business information that corresponds to this location.

10. The communication control device according to claim 1, wherein said location management device includes a location ID transmitter that transmits location ID by a radio signal and a location specification unit that accepts from said portable telephone terminal the location ID that is received by said portable telephone terminal and that specifies the location of said portable telephone terminal based on the location ID.

11. A communication control device capable of communicating with each of a portable telephone terminal that transmits a communication request that designates a terminal of a communication partner, a location management device that specifies a location of said portable telephone terminal, and a charge-object management device that manages a communication record in a location of use of said portable telephone terminal, said communication control device comprising:
a charge area management storage unit that holds, in correspondence with the location of said portable telephone terminal, payer information relating to a payer of communication fees of said portable telephone terminal at the location;
a communication control unit that connects said portable telephone terminal with the terminal of said communication partner that was designated in said communication request by way of a fixed telephone network while making the payer of communication fees of said portable telephone terminal said communication control device side; and
a communication management unit that monitors the communication record of said portable telephone terminal and the terminal of said communication partner by way of said communication control unit, and further, acquires the location of said portable telephone terminal from said location management device, acquires from said charge area management storage unit said payer information that corresponds to the location of said portable telephone terminal, and records in said charge-object management device said communication record and said payer information.

12. The communication control device according to claim 11, wherein, when said communication request has been accepted from said portable telephone terminal, said communication management unit both provides said portable telephone terminal with instructions to transmit to said communication control unit by a prescribed telephone number by which a call-receiving side is charged and provides said communication control unit with instructions to accept transmission from said portable telephone terminal by said prescribed telephone number and then connect said portable telephone terminal with the terminal of said communication partner.

13. The communication control device according to claim 11, wherein said communication management unit, upon having accepted said communication request from said portable telephone terminal, provides instructions to said communication control unit to transmit to both said portable telephone terminal and said communication partner and then to connect said portable telephone terminal with the terminal of said communication partner.

14. The communication control device according to claim 11, wherein said charge area management storage unit holds, as said payer information, business information for specifying businesses that pay communication fees of said portable telephone terminal.

15. The communication control device according to claim 14, wherein said charge area management storage unit holds, in correspondence with the location of said portable telephone terminal or with said business information, valid time information that indicates valid time of communication in which communication fees of the user of said portable telephone terminal are excused.

16. The communication control device according to claim 15, wherein said communication control unit limits communication between said portable telephone terminal and the terminal of said communication partner based on said valid time.

17. The communication control device according to claim 16, wherein said communication management unit records in said charge-object management device communication that uses said communication control unit following said valid time as communication that is billed to the user of said portable telephone terminal.

18. The communication control device according to claim 14, wherein:
said charge area management storage unit holds, in correspondence with the location of said portable telephone terminal or said business information, payment ratios of the user of said portable telephone terminal and said business for said communication fees; and
said communication management unit records in said charge-object management device said payment ratios that correspond to the location of said portable telephone terminal together with said communication record.

19. The communication control device according to claim 11, wherein:
said location management device specifies a location of the terminal of said communication partner; and
said communication management unit, upon having accepted said communication request from said portable telephone terminal, acquires the location of the terminal of said communication partner from said location management device, acquires from said charge area management storage unit said payer information that corresponds to the location of the terminal of said communication partner, and records said payer information in said charge-object management device.

20. The communication control device according to claim 12, wherein:
said charge area management storage unit registers, in addition to said business information, telephone numbers that are used when said communication control unit relays communication between said portable telephone terminal and the terminal of said communication partner; and
said communication management unit changes the telephone number used when said communication control unit relays communication between said portable telephone terminal and the terminal of said communication partner according to the location of said portable telephone terminal or said business information.

21. The communication control device according to claim 11, wherein said location management device includes a location ID transmitter that transmits a location ID by a radio signal, and a location specification unit that accepts from said portable telephone terminal a location ID received by said portable telephone terminal and specifies the location of said portable telephone terminal based on said location ID.

22. A communication control device capable of communicating with each of a portable telephone terminal that transmits a communication request that designates a terminal of a communication partner, a location management device that specifies a location of said portable telephone terminal, and a charge-object management device that manages a communication record in a location of use of said portable telephone terminal; said communication control device comprising:
a charge area management storage unit that holds, in correspondence with the location of said portable telephone terminal, payer information relating to a payer of communication fees of said portable telephone terminal at the location;
a communication control unit that connects said portable telephone terminal with the terminal of said communication partner that was designated in said communication request by way of a fixed telephone network while making the payer of communication fees of said portable telephone terminal said portable telephone terminal side; and
a communication management unit that monitors the communication record of said portable telephone terminal and the terminal of said communication partner by way of said communication control unit, and further, acquires the location of said portable telephone terminal from said location management device, acquires from said charge area management storage unit said payer information that corresponds to the location of said portable telephone terminal, and records in said charge-object management device said communication record and said payer information.

23. The communication control device according to claim 22, wherein said communication management unit, upon having accepted said communication request from said portable telephone terminal, both provides said portable telephone terminal with instructions to transmit to said communication control unit by a specified telephone number by which a transmitting side is charged and provides said communication control unit with instructions to receive transmission from said portable telephone terminal by said specified telephone number and then connect said portable telephone terminal with the terminal of said communication partner.

24. The communication control device according to claim 22, wherein said charge area management storage unit holds, as said payer information, business information for specifying businesses that pay communication fees of said portable telephone terminal.

25. The communication control device according to claim 24, wherein said charge area management storage unit holds, in correspondence with the location of said portable telephone terminal or said business information, valid time information indicating valid time of communication for which communication fees of the user of said portable telephone terminal are excused.

26. The communication control device according to claim 25, wherein said communication control unit limits communication of said portable telephone terminal and the terminal of said communication partner based on said valid time.

27. The communication control device according to claim 26, wherein said communication management unit records in said charge-object management device communication that uses said communication control unit following said valid time as communication for which the user of said portable telephone terminal is billed.

28. The communication control device according to claim 24, wherein:
said charge area management storage unit holds, in correspondence with the location of said portable telephone terminal or said business information, payment ratios of the user of said portable telephone terminal and said businesses for said communication fees; and
said communication management unit records in said charge-object management device said payment ratios that correspond to the location of said portable telephone terminal together with said communication record.

29. The communication control device according to claim 22, wherein:
said location management device further specifies a location of the terminal of said communication partner; and
said communication management unit, upon having accepted the communication request from said portable telephone terminal, acquires the location of the terminal of said communication partner from said location management device, acquires from said charge area management storage unit said payer information that corresponds to the location of the terminal of said communication partner, and records said payer information in said charge-object management device.

30. The communication control device according to claim 23, wherein:
said charge area management storage unit registers, in addition to said business information, telephone numbers that are used when said communication control unit relays communication of said portable telephone terminal and the terminal of said communication partner; and
said communication management unit changes the telephone number used when said communication control unit relays communication of said portable telephone terminal and the terminal of said communication partner according to the location of said portable telephone terminal or said business information.

31. The communication control device according to claim 22, wherein said location management device includes a location ID transmitter that transmits a location ID by a radio signal, and a location specification unit that accepts from said portable telephone terminal location ID received by said portable telephone terminal and specifies the location of said portable telephone terminal based on said location ID.

32. A communication control device capable of communicating with each of a portable telephone terminal that reports a communication start and a communication end, a location management device that specifies a location of said portable telephone terminal, and a charge-object management device that manages a communication record in a location of use of said portable telephone terminal; said communication control device comprising:

a charge area management storage unit that holds, in correspondence with the location of said portable telephone terminal, payer information relating to a payer of communication fees of said portable telephone terminal at the location; and a communication management unit that monitors the communication record of said portable telephone terminal and the terminal of a communication partner of said portable telephone terminal based on the communication starts and communication ends reported from said portable telephone terminal, and further, acquires the location of said portable telephone terminal from said location management device, acquires from said charge area management storage unit said payer information that corresponds to the location of said portable telephone terminal, and records in said charge-object management device said communication record and said payer information.

33. The communication control device according to claim 32, wherein said charge area management storage unit holds, as said payer information, business information for specifying businesses that pay communication fees of said portable telephone terminal.

34. The communication control device according to claim 33, wherein said charge area management storage unit holds, in correspondence with the location of said portable telephone terminal or said business information, valid time information indicating valid time of communication for which communication fees of the user of said portable telephone terminal are excused.

35. The communication control device according to claim 34, wherein said communication management unit records, in said charge-object management device, communication that follows said valid time as communication for which the user of said portable telephone terminal is billed.

36. The communication control device according to claim 33, wherein:

said charge area management storage unit holds, in correspondence with the location of said portable telephone terminal or said business information, payment ratios of the user of said portable telephone terminal and said businesses for said communication fees; and said communication management unit records in said charge-object management device the payment ratios that correspond to the location of said portable telephone terminal together with said communication record.

37. The communication control device according to claim 32, wherein said location management device further specifies a location of the terminal of said communication partner; and said communication management unit further acquires the location of the terminal of said communication partner from said location management device, acquires from said charge area management storage unit said payer information that corresponds to the location of the terminal of said communication partner, and records said payer information in said charge-object management device.

38. The communication control device according to claim 32, wherein said location management device further includes a location ID transmitter that transmits location ID by a radio signal, and a location specification unit that accepts from said portable telephone terminal location ID that was received by said portable telephone terminal and specifies the location of said portable telephone terminal based on the location ID.

39. A location-dependent charge control system comprising the communication control device according to claim 1, and a location management device that specifies the location of a portable telephone terminal that communicates with said communication control device.

40. A location-dependent charge control system comprising the communication control device according to claim 11, a location management device that specifies the location of a portable telephone terminal that communicates with said communication control device, and a charge-object management device that manages a communication record in locations of use of said portable telephone terminal.

41. A location-dependent charge control method performed by a communication control device that can communicate with both a portable telephone terminal that transmits a communication request that designates a terminal of a communication partner and a location management device that specifies a location of said portable telephone terminal, and further, that includes a charge area management storage unit that holds data regarding fee payment areas in which businesses that differ from a user of said portable telephone terminal pay communication fees of said portable telephone terminal; said location-dependent charge control method comprising:

when said communication request is accepted from said portable telephone terminal, acquiring the location of said portable telephone terminal from said location management device; and only when the location of said portable telephone terminal is contained in said fee payment area shown by data that are held in said charge area management storage unit, connecting said portable telephone terminal with the terminal of said communication partner while making said communication control device side the payer of communication fees of said portable telephone terminal.

42. A location-dependent charge control method performed by a communication control device that can communicate with each of a portable telephone terminal that transmits a communication request that designates a terminal of a communication partner, a location management device that specifies a location of said portable telephone terminal, and a charge-object management device that manages a communication record in locations of use of said portable telephone terminal, and further, that includes a charge area management storage unit that holds, in correspondence with the location of said portable telephone terminal, payer information relating to payers of communication fees of said portable telephone terminal at the location; said location-dependent charge control method comprising:

connecting said portable telephone terminal with the terminal of said communication partner designated in said communication request by way of a fixed telephone network while making said communication control device side the payer of communication fees of said portable telephone terminal;

monitoring the communication record of said portable telephone terminal and the terminal of said communication partner;

acquiring the location of said portable telephone terminal from said location management device;

acquiring from said charge area management storage unit said payer information that corresponds to the location of said portable telephone terminal; and recording said communication record and said payer information in said charge-object management device.

43. A location-dependent charge control method performed by a communication control device that can communicate with each of a portable telephone terminal that transmits a communication request that designates a terminal of a communication partner, a location management device that specifies a location of said portable telephone terminal, and a charge-object management device that manages a communication record in locations of use of said portable telephone terminal, and further, that includes a charge area management storage unit that holds, in correspondence with the location of said portable telephone terminal, payer information relating to payers of communication fees of said portable telephone terminal at the location; said location-dependent charge control method comprising:

connecting said portable telephone terminal with the terminal of said communication partner designated in said communication request by way of a fixed telephone network while making said portable telephone terminal side the payer of communication fees of said portable telephone terminal;

monitoring a communication record of said portable telephone terminal and the terminal of said communication partner;

acquiring the location of said portable telephone terminal from said location management device;

acquiring from said charge area management storage unit said payer information that corresponds to the location of said portable telephone terminal; and recording said communication record and said payer information in said charge-object management device.

44. A location-dependent charge control method performed by a communication control device that can communicate with each of a portable telephone terminal that reports communication starts and communication ends, a location management device that specifies a location of said portable telephone terminal, and a charge-object management device that manages a communication record in locations of use of said portable telephone terminal, and further, that includes a charge area management storage unit that holds, in correspondence with the location of said portable telephone terminal, payer information relating to payers of communication fees of said portable telephone terminal at the location; said location-dependent charge control method comprising:

monitoring the communication record of said portable telephone terminal and the terminal of said communication partner of said portable telephone terminal based on communication starts and communication ends reported from said portable telephone terminal;

acquiring the location of said portable telephone terminal from said location management device;

acquiring from said charge area management storage unit said payer information that corresponds to the location of said portable telephone terminal; and recording said communication record and said payer information in said charge-object management device.

45. A communication control device capable of communicating with both a portable telephone terminal for transmitting a communication request that designates a terminal of a communication partner and a location management device for specifying a location of said portable telephone terminal, said communication control device changing a payer of communication fees of said portable telephone terminal according to locations that are specified in said location management device; said communication control device comprising:

charge area management storage means for holding data regarding fee payment areas in which a business that differs from a user of said portable telephone terminal pays the communication fees of said portable telephone terminal;

communication control means that can connect said portable telephone terminal with the terminal of said communication partner while making the payer of the communication fees of said portable telephone terminal said communication control device side; and communication management means for, upon receiving said communication request from said portable telephone terminal, acquiring the location of said portable telephone terminal from said location management device, and providing said communication control means with connection instructions directing connection of said portable telephone terminal with the terminal of said communication partner while making the payer of the communication fees of said portable telephone terminal said communication control device side only when the location of said portable telephone terminal is contained within said fee payment areas indicated by data held in said charge area management storage means.

46. A communication control device capable of communicating with each of a portable telephone terminal for transmitting a communication request that designates a terminal of a communication partner, a location management device for specifying a location of said portable telephone terminal, and a charge-object management device for managing a communication record in a location of use of said portable telephone terminal, said communication control device comprising:

charge area management storage means for holding, in correspondence with the location of said portable telephone terminal, payer information relating to a payer of communication fees of said portable telephone terminal at the location;

communication control means for connecting said portable telephone terminal with the terminal of said communication partner that was designated in said communication request by way of a fixed telephone network while making the payer of communication fees of said portable telephone terminal said communication control device side; and communication management means for monitoring the communication record of said portable telephone terminal and the terminal of said communication partner by way of said communication control means, and further, acquiring the location of said portable telephone terminal from said location management device, acquiring from said charge area management storage means said payer information that corresponds to the location of said portable telephone terminal, and recording in said charge-object management device said communication record and said payer information.

47. A communication control device capable of communicating with each of a portable telephone terminal for transmitting a communication request that designates a terminal of a communication partner, a location management device for specifying a location of said portable telephone terminal, and a charge-object management device for managing a communication record in a location of use of said portable telephone terminal; said communication control device comprising:
- charge area management storage means for holding, in correspondence with the location of said portable telephone terminal, payer information relating to a payer of communication fees of said portable telephone terminal at the location;
- communication control means for connecting said portable telephone terminal with the terminal of said communication partner that was designated in said communication request by way of a fixed telephone network while making the payer of communication fees of said portable telephone terminal said portable telephone terminal side; and
- communication management means for monitoring the communication record of said portable telephone terminal and the terminal of said communication partner by way of said communication control means, and further, acquiring the location of said portable telephone terminal from said location management device, acquiring from said charge area management storage means said payer information that corresponds to the location of said portable telephone terminal, and recording in said charge-object management device said communication record and said payer information.

48. A communication control device capable of communicating with each of a portable telephone terminal for reporting a communication start and a communication end, a location management device for specifying a location of said portable telephone terminal, and a charge-object management device for managing a communication record in a location of use of said portable telephone terminal; said communication control device comprising:
- charge area management storage means for holding, in correspondence with the location of said portable telephone terminal, payer information relating to a payer of communication fees of said portable telephone terminal at the location; and
- communication management means for monitoring the communication record of said portable telephone terminal and the terminal of a communication partner of said portable telephone terminal based on the communication starts and communication ends reported from said portable telephone terminal, and further, acquiring the location of said portable telephone terminal from said location management device, acquiring from said charge area management storage means said payer information that corresponds to the location of said portable telephone terminal, and recording in said charge-object management device said communication record and said payer information.

49. A communication control device for changing the payer of communication fees according to the location of a mobile terminal, comprising:
- a charge area management storage unit for holding data regarding fee payment areas in which a business that differs from the user of said mobile terminal pays communication fees of said mobile terminal;
- a communication control unit that can connect said mobile terminal with the terminal of a communication partner while making said communication control device side the payer of communication fees of said mobile terminal; and
- a communication management unit that, when a communication request has been accepted from said mobile terminal, provides said communication control unit with connection instructions to connect said mobile terminal with the terminal of said communication partner while making said communication control device side the payer of communication fees of said mobile terminal when the location of the mobile terminal is within said fee payment areas shown by data that are held in said charge area management storage unit.

50. A communication control device capable of communicating with both a portable telephone terminal that transmits a communication request that designates a terminal of a communication partner and a location management device that specifies a location of said portable telephone terminal, said communication control device controlling and changing communication based on a call from said portable telephone terminal, choosing a payer of communication fees of the communication between a user of said portable telephone terminal and a service provider according to a location of the call; said communication control device comprising:
- a charge area management storage unit that holds data regarding fee payment areas in which the service provider that differs from the user of said portable telephone terminal pays the communication fees of said portable telephone terminal;
- a communication control unit that can connect said portable telephone terminal with the terminal of said communication partner; and
- a communication management unit that, upon receiving said communication request from said portable telephone terminal, acquires the location of said portable telephone terminal from said location management device, and that provides said communication control unit with connection instructions directing connection of said portable telephone terminal with the terminal of said communication partner while making the payer of the communication fees of said portable telephone terminal said service provider side when the location of said portable telephone terminal is contained within said fee payment areas indicated by data held in said charge area management storage unit, and that provides said communication control unit with connection instructions directing connection of said portable telephone terminal with the terminal of said communication partner while making the payer of the communication fees said user when the location of said portable telephone terminal is not contained within said fee payment areas.

51. The communication control device according to claim 50, wherein, when the location of said portable telephone terminal is contained in said fee payment areas indicated by data that are held in said charge area management storage unit, said communication management unit both: supplies instructions to said portable telephone terminal to transmit to said communication control unit by a prescribed telephone number whereby the receiving side is charged, and provides instructions to said communication control unit to accept a transmission from said portable telephone terminal by said prescribed telephone number and then connect said portable telephone terminal to the terminal of said communication partner.

52. A location-dependent charge control method performed by a communication control device that can communicate with both a portable telephone terminal that transmits a communication request that designates a terminal of a communication partner and a location management device that specifies a location of said portable telephone terminal, the communication control device including a charge area management storage unit that holds data regarding fee payment areas in which a service provider that differs from a user of said portable telephone terminal pays communication fees of said portable telephone terminal, the communication control device controlling and changing communication based on a call from said portable telephone terminal, choosing a payer of communication fees of the communication between a user of said portable telephone terminal and a service provider according to a location of the call; said location-dependent charge control method comprising:

when said communication request is accepted from said portable telephone terminal, acquiring the location of said portable telephone terminal from said location management device; and when the location of said portable telephone terminal is contained in said fee payment area shown by data that are held in said charge area management storage unit, connecting said portable telephone terminal with the terminal of said communication partner while making said service provider side the payer of communication fees of said portable telephone terminal, when the location of said portable telephone terminal is not contained in said fee payment area, connecting said portable telephone terminal with the terminal of said communication partner while making said user the payer of communication fees.

53. The location-dependent charge control method according to claim 52, wherein, said connecting said portable telephone terminal with the terminal of said communication partner while making said service provider side the payer of communication fees of said portable telephone terminal comprises:

supplying instructions to said portable telephone terminal to transmit to said communication control unit by a prescribed telephone number whereby the receiving side is charged, and providing instructions to said communication control unit to accept a transmission from said portable telephone terminal by said prescribed telephone number and then connect said portable telephone terminal to the terminal of said communication partner.

54. A non-transitory computer readable recording medium in which a program is embedded, the program causing a computer to implement a communication control, the computer being able to communicate with both a portable telephone terminal that transmits a communication request that designates a terminal of a communication partner and a location management device that specifies a location of said portable telephone terminal, the computer including a charge area management storage unit that holds data regarding fee payment areas in which a service provider that differs from a user of said portable telephone terminal pays communication fees of said portable telephone terminal, the computer controlling and changing communication based on a call from said portable telephone terminal, choosing a payer of communication fees of the communication between the user of said portable telephone terminal and the service provider according to a location of the call by implementing the program:

the communication control comprising:

when said communication request is accepted from said portable telephone terminal, acquiring the location of said portable telephone terminal from said location management device, and, when the location of said portable telephone terminal is contained in said fee payment area shown by data that are held in said charge area management storage unit, connecting said portable telephone terminal with the terminal of said communication partner while making said service provider side the payer of communication fees of said portable telephone terminal, when the location of said portable telephone terminal is not contained in said fee payment area, connecting said portable telephone terminal with the terminal of said communication partner while making said user the payer of communication fees.

55. The non-transitory computer readable recording medium according to claim 54, wherein, said connecting said portable telephone terminal with the terminal of said communication partner while making said service provider side the payer of communication fees of said portable telephone terminal comprises:

supplying instructions to said portable telephone terminal to transmit to said communication control unit by a prescribed telephone number whereby the receiving side is charged, and providing instructions to said communication control unit to accept a transmission from said portable telephone terminal by said prescribed telephone number and then connect said portable telephone terminal to the terminal of said communication partner.

\* \* \* \* \*